US012793981B2

(12) United States Patent
Roberts et al.

(10) Patent No.: US 12,793,981 B2
(45) Date of Patent: Nov. 10, 2026

(54) METHODS FOR PREPARING ELECTRODE SLURRIES

(71) Applicant: Solid Power Operating, Inc., Louisville, CO (US)

(72) Inventors: Jason E. Roberts, Denver, CO (US); James Bergman, Arvada, CO (US); Morgan Morroni, Denver, CO (US); Alexander Delluva, Boulder, CO (US); Collin R. Becker, Boulder, CO (US)

(73) Assignee: Solid Power Operating, Inc., Louisville, CO (US)

( * ) Notice: Subject to any disclaimer, the term of this patent is extended or adjusted under 35 U.S.C. 154(b) by 0 days.

(21) Appl. No.: 18/981,009

(22) Filed: Dec. 13, 2024

(65) Prior Publication Data

US 2025/0118759 A1 Apr. 10, 2025

Related U.S. Application Data

(63) Continuation of application No. 18/627,374, filed on Apr. 4, 2024.

(60) Provisional application No. 63/457,091, filed on Apr. 4, 2023.

(51) Int. Cl.

| | |
|---|---|
| ***H01M 4/139*** | (2010.01) |
| ***H01M 4/04*** | (2006.01) |
| ***H01M 4/62*** | (2006.01) |
| ***H01M 50/46*** | (2021.01) |
| *H01M 4/02* | (2006.01) |

(52) U.S. Cl.

CPC ......... *H01M 4/623* (2013.01); *H01M 4/0404* (2013.01); *H01M 4/139* (2013.01); *H01M 4/625* (2013.01); *H01M 50/46* (2021.01); *H01M 2004/028* (2013.01); *H01M 2300/0065* (2013.01)

(58) Field of Classification Search

CPC .... H01M 4/623; H01M 50/46; H01M 4/0404; H01M 4/139; H01M 4/625; H01M 2004/028; H01M 2300/0065

See application file for complete search history.

(56) References Cited

U.S. PATENT DOCUMENTS

| | | | | |
|---|---|---|---|---|
| 4,892,590 | A * | 1/1990 | Gill | D21H 21/10 162/175 |
| 10,693,122 | B2 * | 6/2020 | Kim | H01M 4/13 |
| 10,717,890 | B2 | 7/2020 | Bizet et al. | |
| 2017/0191189 | A1 * | 7/2017 | Lust | H01M 4/8853 |
| 2017/0263927 | A1 | 9/2017 | Kim et al. | |
| 2017/0317338 | A1 | 11/2017 | Woehrle et al. | |
| 2019/0006676 | A1 * | 1/2019 | Daughenbaugh | H01M 10/0525 |
| 2019/0305299 | A1 | 10/2019 | Zhang et al. | |
| 2020/0235426 | A1 | 7/2020 | Kushida et al. | |
| 2022/0045366 | A1 | 2/2022 | Huang et al. | |
| 2022/0231288 | A1 | 7/2022 | Tanaami et al. | |
| 2022/0255128 | A1 | 8/2022 | Becker et al. | |
| 2022/0271294 | A1 | 8/2022 | Yamada et al. | |
| 2022/0293956 | A1 * | 9/2022 | Qian | H01M 10/0562 |
| 2023/0112652 | A1 | 4/2023 | Yao | |
| 2023/0268615 | A1 | 8/2023 | Park et al. | |
| 2023/0307603 | A1 | 9/2023 | Becker et al. | |
| 2023/0395773 | A1 | 12/2023 | Fukuyama | |
| 2024/0021798 | A1 | 1/2024 | Ruther et al. | |
| 2024/0039099 | A1 | 2/2024 | Zamani et al. | |
| 2024/0079639 | A1 | 3/2024 | Hwang et al. | |
| 2024/0186584 | A1 | 6/2024 | Delluva et al. | |
| 2024/0274980 | A1 | 8/2024 | Li et al. | |
| 2024/0347733 | A1 * | 10/2024 | Roberts | H01M 4/38 |
| 2024/0356042 | A1 | 10/2024 | Huang et al. | |
| 2025/0087744 | A1 | 3/2025 | Park et al. | |

FOREIGN PATENT DOCUMENTS

| | | | | |
|---|---|---|---|---|
| CN | 104638270 B | * | 6/2019 | H01M 4/62 |
| CN | 119193043 A | | 12/2024 | |
| JP | 2003077542 A | | 3/2003 | |
| JP | 2016-510941 A | | 4/2016 | |
| JP | 2017-182989 A | | 10/2017 | |
| JP | 2022-532237 | * | 7/2022 | H01M 10/0585 |
| KR | 10-2002405 | * | 7/2019 | H01M 4/62 |
| WO | WO 2018/110128 | * | 6/2018 | H01M 4/62 |
| WO | 2019244282 A1 | | 12/2019 | |

OTHER PUBLICATIONS

Goncalves, R., et al., “Electrode fabrication process and its influence in lithium-ion battery performance: State of the art and future trends”. Electrochemistry Communications, vol. 135, Feb. 2022, 107210, pp. 1-6.*

Riphaus, Nathalie, et al., “Slurry-Based Processing of Solid Electrolytes: A Comparative Binder Study”. Journal of the Electrochemical Society, 165 (16) A3993-A3999 (2018).*

Nwabara, Uzoma O., et al., “Binder-Focused Approaches to Improve the Stability of Cathodes for CO2 Electroreduction”. ACS Appl. Energy Mater. 2021, 4, 5175-5186.*

International Searching Authority, International Search Report and Written Opinion, issued for International Application No. PCT/US2024/023152, dated Sep. 16, 2024.

* cited by examiner

*Primary Examiner* — Bret P Chen

(74) *Attorney, Agent, or Firm* — Polsinelli PC; Blake Andrew Ronnebaum

(57) ABSTRACT

Methods for preparing electrode slurries for use in an electrochemical cell include combining a solid electrolyte with a first binder dissolved in a first organic solvent to form a first slurry, combining the first slurry with an electrode active material and a conductive additive to form a second slurry; and adding a second binder dissolved in a second organic solvent to the second slurry, wherein the addition of the second binder yields precipitation of the first binder.

29 Claims, 10 Drawing Sheets

FIG.8
SEPARATOR LAYER 2
SEPARATOR LAYER 1

EXAMPLE 2

METHODS FOR PREPARING ELECTRODE SLURRIES

CROSS-REFERENCE TO RELATED APPLICATIONS

This application is a continuation of U.S. patent application Ser. No. 18/627,374 filed Apr. 4, 2024, titled "Methods for Preparing Electrodes," which claims priority under 35 U.S.C. § 119(e) from U.S. Patent Application No. 63/457,091 filed Apr. 4, 2023, titled "Binder Solubility," each of which are incorporated herein by reference for all purposes.

TECHNICAL FIELD

The present disclosure generally relates to the field of cathodes, cathode slurries in an electrochemical cell, and electrode materials, and the corresponding methods of making and using the same.

BACKGROUND AND INTRODUCTION

Current production methods for solid-state batteries generally include assembling a negative electrode layer (anode), one or more separator layers (electrolyte layers), and a positive electrode layer (cathode). One or more of these layers may be pressed or laminated together to ensure optimal surface-to-surface contact between the layers, resulting in optimal electrochemical performance of the solid-state batteries.

Each layer is generally manufactured in a similar process, wherein the components of each layer are mixed with binders and solvents into a slurry, which is then cast/coated onto a carrier foil or a current collector. The slurry is then dried to remove the solvent, leaving behind a solid layer that can then be incorporated into an electrochemical cell.

The interfaces between each layer of the battery must have a high degree of surface-to-surface contact to ensure maximum performance. Generally, this is accomplished by increasing the amount of binder used in each layer. However, increasing the binder concentration also increases the overall ionic and electronic resistance of the cell because binders generally cannot conduct ions or electrons.

What is needed is an electrochemical cell with high surface-to-surface contact between the layers of the cell and low electronic and ionic resistance.

SUMMARY

In one aspect, disclosed herein, is a method for preparing an electrode slurry in an electrochemical call. The method comprises: combining a solid electrolyte with a first binder dissolved in a first organic solvent and milling the combination to form a first slurry; combining the first slurry with an electrode active material and a conductive additive to form a second slurry; and adding a second binder dissolved in a second organic solvent to the second slurry, wherein the addition of the second binder yields precipitation of the first binder.

In another aspect, disclosed herein, is an additional method for preparing an electrode slurry for use in an electrochemical cell. The method comprises: adding a second binder to a slurry comprising an electrode active material, a conductive additive, a solid electrolyte, a first binder, and a combination of the first organic solvent and second organic solvent; wherein the addition of the second binder causes the precipitation of the first binder.

In yet another aspect, disclosed herein, is a third method for preparing an electrode slurry for use in an electrochemical cell. The method comprises: combining a solid electrolyte with a first binder dissolved in a first organic solvent and milling the combination to form a first slurry; combining the first slurry with an electrodeactive material and a conductive additive to form a second slurry; adding a second binder dissolved in a second organic solvent to the second slurry; casting the second slurry onto a carrier foil; coating a third slurry on top of the second slurry, thereby forming an interface between the second slurry and the third slurry, the third slurry being devoid of the second binder; and drying the second slurry and the third slurry; wherein the addition of the second binder causes the first binder to precipitate in the second slurry, and wherein the dried third slurry comprises the second binder.

In still another aspect, disclosed herein are compositions. The compositions comprise: an electrode layer comprising a precipitated binder; a separator layer in physical contact with the electrode layer comprising the precipitated binder; and an interface formed between the electrode layer and the separator layer, wherein a concentration of the precipitated binder in the electrode layer and the separator layer defines a gradient, the gradient comprising a maximum concentration of the precipitated binder at the interface.

In another aspect, disclosed herein are electrochemical cells. The electrochemical cells are made by the methods described herein. The electrochemical cells generally comprise a current collector; an electrode layer having a high porosity region; and a separator layer in physical contact with the electrode layer, the separator layer having a high porosity region, wherein the electrode layer and the separator layer are in physical contact at an interface, and the interface comprises a low porosity region.

Other features and iterations of the invention are described in more detail below.

DETAILED DESCRIPTION

Figure 1:
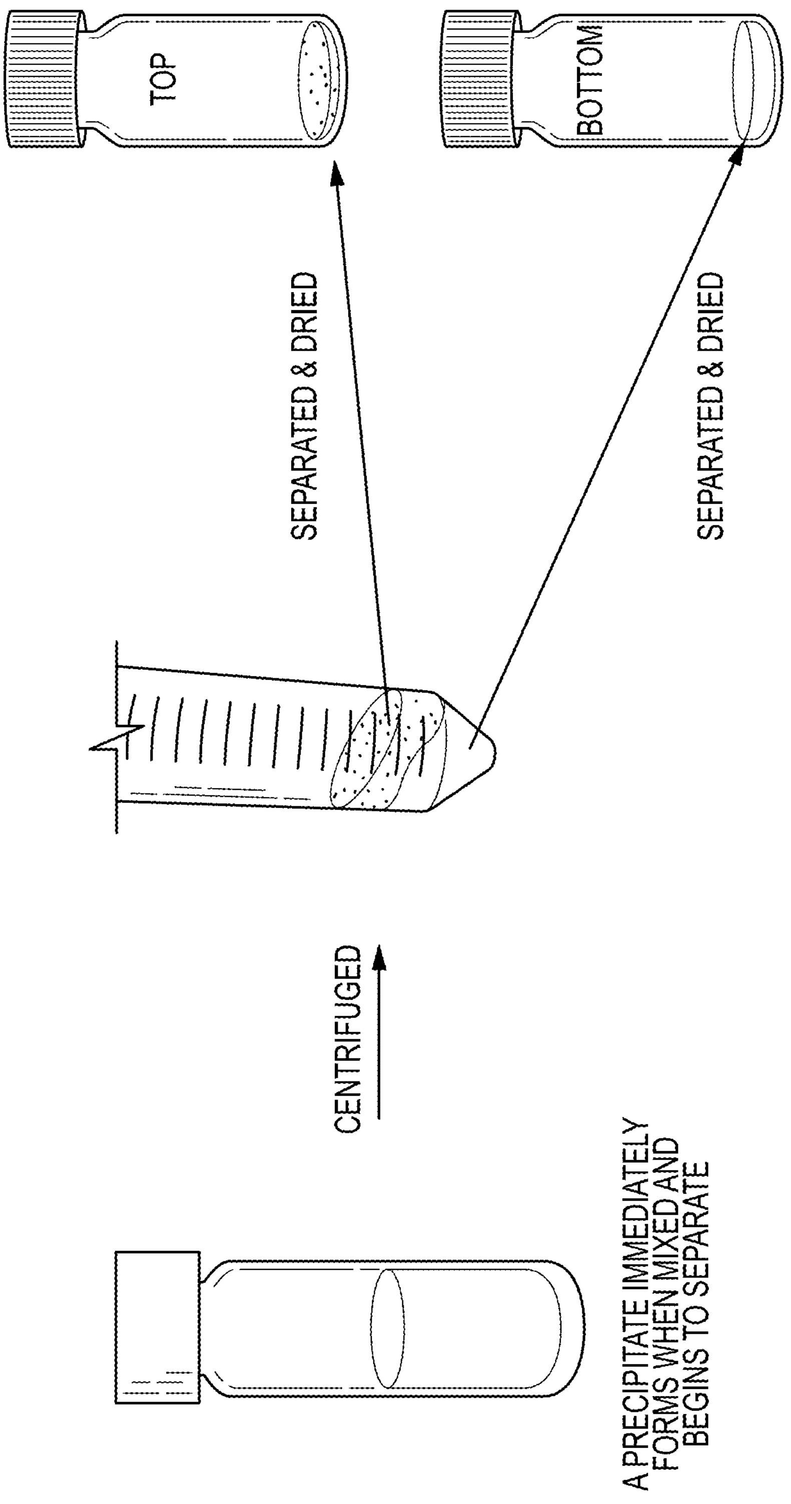
FIG. 1 shows a series of photographs which demonstrates the precipitation of a thermoplastic elastomer (SEBS) from a slurry of a copolymer of Poly(vinylidene fluoride-co-hexafluoropropylene) and SEBS in isobutyl isobutyrate.

In the following description, specific details are provided to impart a thorough understanding of the various embodiments of the disclosure. Upon having read and understood the specification, claims, and drawings hereof, those skilled in the art will understand that some embodiments may be practiced without hewing to some of the specific details set forth herein. Moreover, to avoid obscuring the disclosure, some well-known methods, processes, devices, and systems utilized in the various embodiments described herein are not disclosed in detail.

Provided herein are methods for preparing an electrode slurry for use in an electrochemical cell. One method comprises combining a solid electrolyte with a first binder dissolved in a first organic solvent and milling the combination to form a first slurry; combining the first slurry with an electrode active material and a conductive additive to form a second slurry; and adding a second binder dissolved in a second organic solvent to the second slurry, wherein the addition of the second binder yields precipitation of the first binder. Another method comprises adding a second binder to a slurry comprising an electrode active material, a conductive additive, a solid electrolyte, a first binder, and a combination of the first organic solvent and second organic solvent, wherein the addition of the second binder causes the precipitation of the first binder. Yet another method comprises combining a solid electrolyte with a first binder dissolved in a first organic solvent and milling the combination to form a first slurry; combining the first slurry with an electrode active material and a conductive additive to form a second slurry; adding a second binder dissolved in a second organic solvent to the second slurry; casting the second slurry onto a carrier foil; coating a third slurry on top of the second slurry, thereby forming an interface between the second slurry and the third slurry, the third slurry being devoid of the second binder; and drying the second slurry and the third slurry; wherein the dried third slurry comprises the second binder.

The inventors surprisingly found that when these binder solutions are added to the electrode slurry in a specific order, and, when incorporated (i.e., dissolved), one or more of the binders precipitates out of the solution leaving the remaining binder(s) dissolved. The electrode slurry is then cast onto a current collector and dried causing the remaining binder(s) to precipitate. Without wishing to be bound by any theory, these methods disclosed herein create an electrode slurry that causes the first binder to precipitate and the second binder to remain dissolved in the slurry. The remaining binder incorporated in the remaining solution may be evaporated to produce a solid second binder.

I. Method for Preparing an Electrode Slurry

In one aspect, the present disclosure provides a method for preparing an electrode slurry. The method comprises combining one or more electrode components with a first binder dissolved in a first organic solvent to form a first slurry; and adding a second binder dissolved in a second organic solvent to the first slurry, wherein the addition of the second binder yields precipitation of the first binder. The one or more electrode components may include an electrode active material, a solid electrolyte material, a conductive additive, or a combination thereof. In another embodiment, the method comprises combining one or more electrode components with a first binder dissolved in a first organic solvent to form a first slurry; combining the first slurry with one or more additional electrode components to form a second slurry; and adding a second binder dissolved in a second organic solvent to the first slurry, wherein the addition of the second binder yields precipitation of the first binder. The slurries may be coated/cast onto a current collector.

(A) Combining an Electrode Component and a First Binder Dissolved in a First Organic Solvent to Form a First Slurry The first step in the method includes combining one or more electrode components with a first binder dissolved in a first organic solvent and milling the combination to form a first slurry.

Electrode Components

The one or more electrode components may include a solid electrolyte material. Non-limiting examples of solid electrolyte materials include an oxide electrolyte, an oxysulfide electrolyte, a sulfide electrolyte, a halide electrolyte, and a nitride electrolyte.

In some embodiments, solid electrolyte materials may comprise a sulfide solid electrolyte material, i.e., a solid electrolyte having at least one sulfur component. In some embodiments, the one or more solid electrolytes may comprise one or more material combinations such as $Li_2S—P_2S_5$, $Li_2S—P_2S_5—LiI$, $Li_2S—P_2S_5—GeS_2$, $Li_2S—P_2S_5—Li_2O$, $Li_2S—P_2S_5—Li_2O—LiI$, $Li_2S—P_2S_5—LiI—LiBr$, $Li_2S—SiS_2$, $Li_2S—SiS_2—LiI$, $Li_2S—SiS_2—LiBr$, $Li_2S—S—SiS_2—LiCl$, $Li_2S—S—SiS_2—B_2S_3—LiI$, $Li_2S—S—SiS_2—P_2S_5—LiI$, $Li_2S—B_2S_3$, $Li_2S—P_2S_5—Z_mS_n$ (where m and n are positive numbers, and Z is Ge, Zn or Ga), $Li_2S—GeS_2$, $Li_2S—S—SiS_2—Li_3PO_4$, and $Li_2S—S—SiS_2—Li_xMO_y$ (where x and y are positive numbers, and M is P, Si, Ge, B, Al, Ga or In).

In another embodiment, the solid electrolyte material may be one or more of $Li_3PS_4$, $Li_4P_2S_6$, $Li_7P_3S_{11}$, $Li_{10}GeP_2S_{12}$, $Li_{10}SnP_2S_{12}$. In a further embodiment, the solid electrolyte may be an argyrodite electrolyte, such as one or more of a $Li_6PS_5Cl$, $Li_6PS_5Br$, $Li_6PS_5I$ or expressed by the formula $Li_{7-y}PS_{6-y}X_y$ where "X" represents at least one halogen and/or at least one pseudo-halogen, and where $0<y\leq 2.0$ and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN. In yet another embodiment, the solid-state electrolyte material be expressed by the formula $Li_{8-y-z}P_2S_{9-y-z}X_yW_z$ (where "X" and "W" represents at least one halogen and/or at least one pseudo-halogen and where $0\leq y\leq 1$ and $0\leq z\leq 1$) and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN.

In an additional embodiment, the solid electrolyte material may be a halide electrolyte. Halide solid electrolytes may have the structure Li-M-X, M is a metal element, and X is a halogen. These maybe expressed by the generic formula $Li_\alpha M^{4+}{}_\beta N^{3+}{}_{(1-\beta)}X_\Omega Y_{(6-\Omega)}$, where: $0\leq\beta\leq 1$; $0\leq\Omega\leq 6$; $\alpha=6-[(\beta*4)+(1-\beta)*3]$; X and Y are a halogen such as F, Cl, Br, I; M is an element with an oxidation state of $4^+$ such as Ti, Zr, Hf, and Rf; and N is an element an oxidation state of $3^+$ such as Ga, In, and Tl, Sc, Y, Fe, Ru, Os, Er. Examples of halide electrolytes include $Li_2ZrCl_6$, $Li_3InCl_6$, $Li_{2.25}Hf_{0.75}Fe_{0.25}Cl_4Br_2$.

An electrode active material is added to the first slurry. The electrode active material may include an anode active material or a cathode active material.

The electrode slurry may comprise an electrode active material (such as an anode active material or a cathode active material), a conductive additive, a solid-state electrolyte material, a first binder, and a solvent.

When the electrode active material is an anode active material, the anode active material may comprise one or more materials such as Silicon (Si), Tin (Sn), Germanium (Ge), graphite, $Li_4Ti_5O_{12}$ (LTO) or other known anode active materials.

Generally, when the electrode active material is a cathode active material, the cathode active material comprises a coated metal oxide, an uncoated metal oxide, a coated metal sulfide, an uncoated metal sulfide, and elemental sulfide, and/or a metal fluoride. In one embodiment, the cathode active material may comprise a coated or an uncoated metal oxide. Non-limiting examples of coated or uncoated metal oxides may be $V_2O_5$, $V_6O_{13}$, $MoO_3$, $LiCoO_2$, $LiNiO_2$, $LiMnO_2$, $LiMn_2O_4$, $LiNi_{1-Y}Co_YO_2$, $LiCo_{1-Y}Mn_YO_2$, $LiNi_{1-Y}Mn_YO_2$ ($0 \leq Y<1$), $Li(Ni_aCo_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ ($0<Z<2$), $LiCoPO_4$, $LiFePO_4$, CuO, $Li(Ni_aCo_bAl_c)O_2$ ($0<a<1$, $0<b<1$, $0<c<1$, $a+b+c=1$) or a combination thereof.

In another embodiment, the cathode active material may comprise a coated or an uncoated metal sulfide. Non-limiting examples of coated or uncoated metal sulfide may be titanium sulfide ($TiS_2$), molybdenum sulfide ($MoS_2$), iron sulfide (FeS, $FeS_2$), copper sulfide (CuS), and nickel sulfide ($Ni_3S_2$), or combination thereof. In still another embodiment, the cathode active material may comprise elemental sulfur (S).

In an additional embodiment, the cathode active material may comprise a fluoride, such as but not limited to lithium fluoride (LiF), sodium fluoride (NaF), calcium fluoride ($CaF_2$), magnesium fluoride ($MgF_2$), nickel (II) fluoride ($NiF_2$), iron (III) fluoride ($FeF_3$), vanadium (III) fluoride ($VF_3$), cobalt (III) fluoride ($CoF_3$), chromium (III) fluoride ($CrF_3$), manganese (III) fluoride ($MnF_3$), aluminum fluoride ($AlF_3$), and zirconium (IV) fluoride ($ZrF_4$), or combinations thereof. In one embodiment, the cathode active material is lithium nickel manganese cobalt oxide (NMC).

Conductive Additive

A conductive additive may be combined with the first binder to form the first slurry. In general, the conductive additive comprises a conductive carbon material. Non-limiting examples of suitable carbon material may be carbon fiber, graphite, graphene, carbon black, conductive carbon, amorphous carbon, vapor grown carbon fiber (VGCF), activated carbon, carbon nanotubes, and combinations thereof.

First Binder

In general, the first binder comprises one or more of a thermoplastic elastomer(s). Suitable non-limiting examples of thermoplastic elastomers include styrene-butadiene rubber (SBR), styrene-butadiene-styrene block copolymer (SBS), styrene-isoprene block copolymer (SIS), styrene-ethylene-butylene-styrene block copolymer (SEBS), polyacrylonitrile (PAN), nitrile-butylene rubber (NBR), polybutadiene, polyisoprene, poly (methacrylate) nitrile-butadiene rubber (PMMA-NBR) and the like. In an embodiment, the first binder is a styrene-ethylene-butylene-styrene block copolymer (SEBS).

Generally, the first binder may be present in the first slurry in an amount from about 1.0% to about 40.0% by weight of the first slurry. In various embodiments, the first binder may be present in the first slurry is in an amount from about 1.0% to about 40.0%, about 1.0% to about 10.0%, about 1.0% to about 15.0%, about 5.0% to about 20.0%, about 10.0% to about 20.0%, from about 15.0% to about 20.0%, from about 20.0% to about 25.0%, from about 20.0% to about 30.0%, from about 20.0% to about 35.0%, from about 20.0% to about 40%, from about 30.0% to about 35.0%, or from about 30.0% to about 40.0%. In an embodiment, the first binder is present in the first slurry in an amount from about 4% to about 5% by weight.

Surfactant

Although less preferred, the electrode slurry may alternatively be formed by the addition of a surfactant instead of the addition of a first binder. In such embodiments, the first binder may be added in a later step. Suitable surfactants may include anionic surfactants, nonionic surfactants, cationic surfactants, or zwitterionic surfactants. Exemplary surfactants that may be used include sodium laurylsulfate, ammonium laurylsulfate, sodium dodecylsulfate, ammonium dodecylsulfate, sodium octylsulfate, sodium decylsulfate, sodium tetradecylsulfate, sodium hexadecylsulfate, sodium octadecylsulfate, sodium dodecyl benzene sulfate, sodium lauryl benzene sulfate, sodium hexadecyl benzene sulfate, and other surfactants known in the art.

First Organic Solvent

Generally, the first slurry comprises a first organic solvent. The first organic solvent may be a single solvent or a blend of solvents. The first organic solvent may be a non-polar or weakly polar organic solvent or a polar organic solvent. Suitable examples of polar solvents include, but are not limited to; alcohols such as methanol, ethanol, isopropanol, n-propanol, iso-butanol, n-butanol, s-butanol, t-butanol, and the like; diols such as propylene glycol; organic acids such as formic acid, acetic acid, and so forth; amines such as trimethylamine, or triethylamine, and the like; amides such as formamide, acetamide, acetonitrile, dichloromethane (DCM), diethoxymethane, N,N-dimethylacetamide (DMAC), N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, 1,4-dioxane, N-methyl-2-pyrrolidinone (NMP), ethyl formate, formamide, hexamethylphosphoramide, N-methylacetamide, N-methylformamide, methylene chloride, nitrobenzene, nitromethane, propionitrile, butyronitrile, pyrrolidine, sulfolane, tetramethylurea, tetrahydrofuran (THF), 2-methyltetrahydrofuran, trichloromethane, and combinations thereof. Suitable examples of non-polar solvents include, but are not limited to, alkane and substituted alkane solvents (including cycloalkanes), aromatic hydrocarbons, esters, ethers, combinations thereof, and the like. Specific non-polar or weakly polar organic solvents that may be employed include, for example, benzene, xylene, butyl butyrate, isobutyl isobutyrate, methyl propionate, ethyl propionate, propyl propionate, butyl propionate, methyl acetate, ethyl acetate, propyl acetate, butyl acetate, t-butyl methyl ether, chlorobenzene, chloroform, chloromethane, cyclohexane, dichloromethane, dichloroethane, diethyl ether, ethyl acetate, benzyl ether, diethylene glycol, fluorobenzene, heptane, hexane, isopropyl acetate, methyl tetrahydrofuran, pentyl acetate, tetrahydrofuran, toluene, and combinations thereof. In an embodiment, the first organic solvent may be isobutyl isobutyrate (IBIB).

Conditions

In general, the one or more electrode components, the first binder, and the first organic solvent in this step (i.e., step A) may be added in any sequential order and/or in various portions. Once added, these components may be mixed and milled to provide a dispersed solution and to reduce the particle size of the one or more electrode components, the solid electrolyte, or the first binder (or the surfactant) to form the first slurry. Suitable, non-limiting examples to combine and reduce the particle size of the solid electrolyte include ball milling, bead milling, high shear mixers, an overhead stirrer, or a vortexer.

Various types of ball-milling equipment are known in the art to not only disperse (i.e., mix, combine, etc.) but also reduce the particle size of the one or more electrode components, the solid electrolyte, or the first binder (or the surfactant) to a predefined particle size, such as a mixer mill, a cryomill, a high energy ball mill, a planetary ball mill, and a drum mill.

High shear mixers and overhead mixers may also be utilized. These high speed or overhead mixers may be used to combine wet and dry ingredients. These mixers may be equipped with various blades which not only disperse the components but also reduce the particle size of the components.

Various types of bead milling equipment are known in the art such as continuous bead milling equipment or batch bead milling equipment. These bead milling equipment may use wet bead milling or dry bead milling. In these cases, beads are utilized to reduce the particle size of the one or more electrode components the solid electrolyte, or the first binder (or the surfactant) to a desired particle size.

This step in the method (i.e., step A) may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the one or more electrode components, the first binder (or the surfactant), and the first organic solvent, and whether other materials (e.g., a conductive additive) are present. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

(A1) Optionally Combining the First Slurry With One or More Additional Electrode Components to Form a Second Slurry Before Adding a Second Binder Dissolved in a Second Organic Solvent The method may include combining the first slurry with one or more additional electrode components to form a second slurry. The one or more additional electrode components may be any of the one or more additional electrode components described in Section I(A) above.

Conditions

In general, the one or more additional electrode components in this step may be added to the first slurry in any sequential order or in various portions. Once added, these components are mixed or milled to provide a dispersed second slurry that reduces the particle size of the conductive material and the conductive additive. Various methods are known in the art to disperse and/or reduce the particle size of the components, such as milling.

In preferred embodiments, a ball mill is used to reduce the particle size of the electrode components.

This step in the method may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the one or more additional electrode components, and the first slurry. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

(B) Adding a Second Binder Dissolved in a Second Organic Solvent to the First Slurry The next step in the method encompasses adding a second binder dissolved in a second organic solvent to the first slurry. Upon addition of the second binder and second organic solvent, the first binder begins to precipitate and/or crystallize from the slurry. There may be a delay between the addition of the second binder to the first slurry and the formation of the precipitate. The delay may be from about 1 to about 5 seconds, or the delay may be as great as a minute, or more.

Second Binder

A second binder dissolved in a second organic solvent may be added to the first slurry. In general, the second binder comprises a fluoropolymer. In some embodiments, the fluoropolymer may contain vinylidene fluoride (VdF) and hexafluoropropylene (HFP) as structural units. Specific examples include homopolymers such as polyvinylidene fluoride (PVdF), polyhexafluoropropylene (PHFP), and binary copolymers such as copolymers of VdF and HFP such as poly (vinylene difluoride-hexafluoropropylene) copolymer (PVdF-HFP), and the like. In some examples, the fluoropolymer may include Poly(vinylidene fluoride-co-hexafluoropropylene).

Generally, the second binder may be present in the first slurry in an amount from about 1.0% to about 40.0% by weight of the first slurry. In various embodiments, the second binder may be present in the first slurry in an amount from about 1.0% to about 40.0%, about 1.0% to about 10.0%, about 1.0% to about 15.0%, about 5.0% to about 20.0%, about 10.0% to about 20.0%, from about 15.0% to about 20.0%, from about 20.0% to about 25.0%, from about 20.0% to about 30.0%, from about 20.0% to about 35.0%, from about 20.0% to about 40%, from about 30.0% to about 35.0%, or from about 30.0% to about 40.0%. In an embodiment, the second binder is present in the first slurry in an amount from about 4% to about 5% by weight.

Second Organic Solvent

A second organic solvent is added with the second binder to the first slurry. Generally, the second organic solvent may be the same or different than the first organic solvent. The second organic solvent may be a single solvent or a blend of solvents. In various embodiments, the second organic solvent may be a non-polar organic solvent or a polar organic solvent. Suitable, non-limiting examples of the solvents are disclosed in Section I(A) above. In an embodiment, the second organic solvent may be isobutyl isobutyrate (IBIB).

Conditions

The addition of the second binder dissolved in the second organic solvent in this step (i.e., step B) may be performed all at once or in various portions. Once added, these components are mixed. Various methods are known in the art to mix a solution in a slurry such as an overhead mixer or a magnetic stirrer.

This step in the method may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the second binder and the second solvent. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

II. Second Method for Preparing an Electrode Slurry

In one aspect, the present disclosure provides a method for preparing an electrode slurry. The method comprises combining a solid electrolyte with a first binder dissolved in a first organic solvent and milling the combination to form a first slurry; combining the first slurry with an electrode active material and a conductive additive to form a second slurry; and adding a second binder dissolved in a second organic solvent to the second slurry, wherein the addition of the second binder yields precipitation of the first binder. The slurry may be coated/cast onto a current collector. Alternately, the second slurry may be coated/cast onto a carrier foil.

(A) Combining a Solid Electrolyte With a First Binder Dissolved in a First Organic Solvent and Milling the Combination to Form a First Slurry The first step in the method includes combining a solid electrolyte with a first binder dissolved in a first organic solvent and milling the combination to form a first slurry.

Solid Electrolyte

Generally, the electrode slurry comprises a solid electrolyte. Non-limiting examples of solid electrolytes comprises an oxide electrolyte, an oxysulfide electrolyte, a sulfide electrolyte, a halide electrolyte, and a nitride electrolyte.

In some embodiments, solid electrolyte materials may comprise a sulfide solid electrolyte material, i.e., a solid electrolyte having at least one sulfur component. In some embodiments, the one or more solid electrolytes may comprise one or more material combinations such as $Li_2S—P_2S_5$, $Li_2S—P_2S_5—LiI$, $Li_2S—P_2S_5—GeS_2$, $Li_2S—P_2S_5—Li_2O$, $Li_2S—P_2S_5—Li_2O—LiI$, $Li_2S—P_2S_5—LiI—LiBr$, $Li_2S—SiS_2$, $Li_2S—SiS_2—LiI$, $Li_2S—SiS_2—LiBr$, $Li_2S—S—SiS_2—LiCl$, $Li_2S—S—SiS_2—B_2S_3—LiI$, $Li_2S—S—SiS_2—P_2S_5—LiI$, $Li_2S—B_2S_3$, $Li_2S—P_2S_5—Z_mS_n$ (where m and n are positive numbers, and Z is Ge, Zn or Ga), $Li_2S—GeS_2$, $Li_2S—S—SiS_2—Li_3PO_4$, and $Li_2S—S—SiS_2—Li_xMO_y$ (where x and y are positive numbers, and M is P, Si, Ge, B, Al, Ga or In).

In another embodiment, the solid electrolyte material may be one or more of $Li_3PS_4$, $Li_4P_2S_6$, $Li_7P_3S_{11}$, $Li_{10}GeP_2S_{12}$, $Li_{10}SnP_2S_{12}$. In a further embodiment, the solid electrolyte may be an argyrodite electrolyte, such as one or more of a $Li_6PS_5Cl$, $Li_6PS_5Br$, $Li_6PS_5I$ or expressed by the formula $Li_{7-y}PS_{6-y}X_y$ where "X" represents at least one halogen and/or at least one pseudo-halogen, and where $0<y\leq2.0$ and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN. In yet another embodiment, the solid-state electrolyte material be expressed by the formula $Li_{8-y-z}P_2S_{9-y-z}X_yW_z$ (where "X" and "W" represents at least one halogen and/or at least one pseudo-halogen and where $0\leq y\leq1$ and $0\leq z\leq1$) and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN.

In an additional embodiment, the solid electrolyte material may be a halide electrolyte. Halide solid electrolytes may have the structure Li-M-X, M is a metal element, and X is a halogen. These maybe expressed by the generic formula $Li_\alpha M^{4+}{}_\beta N^{3+}{}_{(1-\beta)}X_\Omega Y_{(6-\Omega)}$, where: $0\leq\beta\leq1$; $0\leq\Omega\leq6$; $\alpha=6-[(\beta*4)+(1-\beta)*3]$; X and Y are a halogen such as F, Cl, Br, I; M is an element with an oxidation state of $4^+$ such as Ti, Zr, Hf, and Rf; and N is an element an oxidation state of $3^+$ such as Ga, In, and Tl, Sc, Y, Fe, Ru, Os, Er. Examples of halide electrolytes include $Li_2ZrCl_6$, $Li_3InCl_6$, $Li_{2.25}Hf_{0.75}Fe_{0.25}Cl_4Br_2$.

In general, the solid electrolyte may be present in the first slurry in an amount of about 0% to about 60% by weight of the electrode slurry. In various embodiments, the solid electrolyte may be present in the first slurry in an amount of about 0% to about 10% by weight, about 0% to about 20% by weight, about 0% to about 30% by weight, about 0% to about 40% by weight, about 0% to about 50% by weight, about 10% to about 60% by weight, about 20% to about 60% by weight, about 30% to about 60% by weight, about 40% to about 60% by weight, or about 50% to about 60% by weight. In some embodiments, the solid electrolyte material may be present in an amount of about 5%, 10%, 15%, 20%, 25%, 30%, 35%, 40%, 45%, 50%, 55%, or 60% by weight of the first slurry.

First Binder

In general, the first binder comprises one or more of a thermoplastic elastomer(s). Suitable non-limiting examples of thermoplastic elastomers include styrene-butadiene rubber (SBR), styrene-butadiene-styrene block copolymer (SBS), styrene-isoprene block copolymer (SIS), styrene-ethylene-butylene-styrene block copolymer (SEBS), polyacrylonitrile (PAN), nitrile-butylene rubber (NBR), polybutadiene, polyisoprene, poly (methacrylate) nitrile-butadiene rubber (PMMA-NBR) and the like. In an embodiment, the first binder is a styrene-ethylene-butylene-styrene block copolymer (SEBS).

Generally, the first binder may be present in the first slurry in an amount of about 1.0% to about 40.0% by weight of the first slurry. In various embodiments, the first binder may be present in the first slurry is in an amount of about 1.0% to about 40.0%, about 1.0% to about 10.0%, about 1.0% to about 15.0%, about 5.0% to about 20.0%, about 10.0% to about 20.0%, from about 15.0% to about 20.0%, from about 20.0% to about 25.0%, from about 20.0% to about 30.0%, from about 20.0% to about 35.0%, from about 20.0% to about 40%, from about 30.0% to about 35.0%, or from about 30.0% to about 40.0%. In an embodiment, the first binder is present in the first slurry is in an amount of about 4% to about 5% by weight.

Surfactant

Although less preferred, the electrode slurry may alternatively be formed by the addition of a surfactant instead of the addition of a first binder. In such embodiments, the first binder may be added in a later step. Suitable surfactants may include anionic surfactants, nonionic surfactants, cationic surfactants, or zwitterionic surfactants. Exemplary surfactants that may be used include sodium laurylsulfate, ammonium laurylsulfate, sodium dodecylsulfate, ammonium dodecylsulfate, sodium octylsulfate, sodium decylsulfate, sodium tetradecylsulfate, sodium hexadecylsulfate, sodium octadecylsulfate, sodium dodecyl benzene sulfate, sodium lauryl benzene sulfate, sodium hexadecyl benzene sulfate, and other surfactants known in the art.

First Organic Solvent

Generally, the first slurry comprises a first organic solvent. The first organic solvent may be a single solvent or a blend of solvents. The first organic solvent may be a non-polar or weakly polar organic solvent or a polar organic solvent. Suitable examples of polar solvents include, but are not limited to; alcohols such as methanol, ethanol, isopropanol, n-propanol, iso-butanol, n-butanol, s-butanol, t-butanol, and the like; diols such as propylene glycol; organic acids such as formic acid, acetic acid, and so forth; amines such as trimethylamine, or triethylamine, and the like; amides such as formamide, acetamide, acetonitrile, dichloromethane (DCM), diethoxymethane, N,N-dimethylacetamide (DMAC), N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, 1,4-dioxane, N-methyl-2-pyrrolidinone (NMP), ethyl formate, formamide, hexamethylphosphoramide, N-methylacetamide, N-methylformamide, methylene chloride, nitrobenzene, nitromethane, propionitrile, butyronitrile, pyrrolidine, sulfolane, tetramethylurea, tetrahydrofuran (THF), 2-methyltetrahydrofuran, trichloromethane, and combinations thereof. Suitable examples of non-polar solvents include, but are not limited to, alkane and substituted alkane solvents (including cycloalkanes), aromatic hydrocarbons, esters, ethers, combinations thereof, and the like. Specific non-polar or weakly polar organic solvents that may be employed include, for example, benzene, xylene, butyl butyrate, isobutyl isobutyrate, methyl propionate, ethyl propionate, propyl propionate, butyl propionate, methyl acetate, ethyl acetate, propyl acetate, butyl acetate, t-butyl methyl ether, chlorobenzene, chloroform, chloromethane, cyclohexane, dichloromethane, dichloroethane, diethyl ether, ethyl acetate, benzyl ether, diethylene glycol, fluorobenzene, heptane, hexane, isopropyl acetate, methyl tetrahydrofuran, pentyl acetate, tetrahydrofuran, toluene, and combinations thereof. In an embodiment, the first organic solvent may be isobutyl isobutyrate (IBIB).

Conditions

In general, the solid electrolyte, the first binder, and the first solvent in this step may be added in any sequential order and/or in various portions. Once added, these components are combined and milled to provide a dispersed solution and to reduce the particle size of the solid electrolyte to form the first slurry. Suitable, non-limiting examples to combine and reduce the particle size of the solid electrolyte may be a ball milling, bead milling, high shear mixers, an overhead stirrer, or a vortexer.

Various types of ball-milling equipment are known in the art to not only disperse (I.e., mix, combine, etc.) but also reduce the particle size to a predefined particle size of the solid electrolyte and the first binder such as a mixer mill, a cryomill, a high energy ball mill, a planetary ball mill, and a drum mill.

High shear mixers and overhead mixers may also be utilized. These high speed or overhead mixers may be used to combine wet and dry ingredients. These mixers may be equipped with various blades which not only disperse the components but also reduce the particle size of the components.

Various types of bead milling equipment are known in the art such as a continuous bead milling equipment or a batch bead milling equipment. These bead milling equipment may use wet bead milling equipment or dry bead milling equipment. In these cases, beads are utilized to reduce the particle size to a desired particle size.

This step in the method (i.e., step A) may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the solid electrolyte, the first binder, and the first solvent. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

(B) Combining the First Slurry With an Electrode Active Material and a Conductive Additive to Form a Second Slurry The next step in the method includes combining the first slurry with an electrode active material and a conductive additive to form a second slurry. Combining the electrode active material and the conductive additive after the high sheer mixing of the first slurry may reduce the likelihood of causing undesirable side reactions that would otherwise take place. Formation of the first slurry and the contents thereof are described in Section II(A) above.

Electrode Active Material

An electrode active material is added to the first slurry. The electrode active material may include an anode active material or a cathode active material.

When the electrode active material is an anode active material, the anode active material may comprise one or more materials such as Silicon (Si), Tin (Sn), Germanium (Ge), graphite, $Li_4Ti_5O_{12}$ (LTO) or other known anode active materials.

Generally, when the electrode active material is a cathode active material, the cathode active material comprises a coated metal oxide, an uncoated metal oxide, a coated metal sulfide, an uncoated metal sulfide, and elemental sulfide, and/or a metal fluoride. In one embodiment, the cathode active material may comprise a coated or an uncoated metal oxide. Non-limiting examples of coated or uncoated metal oxides may be $V_2O_5$, $V_6O_{13}$, $MoO_3$, $LiCoO_2$, $LiNiO_2$, $LiMnO_2$, $LiMn_2O_4$, $LiNi_{1-Y}Co_YO_2$, $LiCo_{1-Y}Mn_YO_2$, $LiNi_{1-Y}Mn_YO_2$ ($0 \leq Y<1$), $Li(Ni_aCo_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ ($0<Z<2$), $LiCoPO_4$, $LiFePO_4$, CuO, $Li(Ni_aCo_bAl_c)O_2$ ($0<a<1$, $0<b<1$, $0<c<1$, $a+b+c=1$) or a combination thereof.

In another embodiment, the cathode active material may comprise a coated or an uncoated metal sulfide. Non-limiting examples of coated or uncoated metal sulfide may be titanium sulfide ($TiS_2$), molybdenum sulfide ($MoS_2$), iron sulfide (FeS, $FeS_2$), copper sulfide (CuS), and nickel sulfide ($Ni_3S_2$), or combination thereof. In still another embodiment, the cathode active material may comprise elemental sulfur (S).

In an additional embodiment, the cathode active material may comprise a fluoride, such as but not limited to lithium fluoride (LiF), sodium fluoride (NaF), calcium fluoride ($CaF_2$), magnesium fluoride ($MgF_2$), nickel (II) fluoride ($NiF_2$), iron (III) fluoride ($FeF_3$), vanadium (III) fluoride ($VF_3$), cobalt (III) fluoride ($CoF_3$), chromium (III) fluoride ($CrF_3$), manganese (III) fluoride ($MnF_3$), aluminum fluoride ($AlF_3$), and zirconium (IV) fluoride ($ZrF_4$), or combinations thereof. In one embodiment, the cathode active material is lithium nickel manganese cobalt oxide (NMC).

The electrode active material may have a concentration in the second slurry from about 70 wt % to about 99.9 wt %. For example, the electrode active material may have a concentration in the second slurry from about 70 wt % to about 80 wt %, about 70 wt % to about 70 wt % to about 85 wt %, about 70 wt % to about 90 wt %, about 70 wt % to about 95 wt % about 70 wt % to about 99.9 wt %, about 80 wt % to about 99.9 wt %, about 85 wt % to about 99.9 wt %, about 90 wt % to about 99.9 wt %, about 95 wt % to about 99.9 wt %, about 80 wt % to about 95 wt %, or about 80 wt % to about 90 wt %. Further, the electrode active material may have a concentration in the second slurry of at least about 70 wt %, at least about 80 wt %, at least about 85 wt %, at least about 90 wt %, or at least about 95 wt %. In some examples, the electrode active material may have a concentration in the second slurry of about 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or about 99.9 wt %.

Conductive Additive

A conductive additive may be added to the first slurry. In general, the conductive additive comprises a conductive carbon material. Non-limiting examples of suitable carbon material may be carbon fiber, graphite, graphene, carbon black, conductive carbon, amorphous carbon, vapor grown carbon fiber (VGCF), activated carbon, carbon nanotubes, and combinations thereof.

The conductive additive may have a concentration in the second slurry from about 0.1 wt % to about 10 wt %. For example, the conductive additive may have a concentration in the second slurry from about 0.1 wt % to about 0.5 wt %, about 0.1 wt % to about 1 wt %, about 0.1 wt % to about 2.5 wt %, about 0.1 wt % to about 5 wt %, about 0.1 wt % to about 7.5 wt %, about 0.1 wt % to about 10 wt %, about 1 wt % to about 10 wt %, about 2.5 wt % to about 10 wt %, about 5 wt % to about 10 wt %, about 7.5 wt % to about 10 wt %, about 1 wt % to about 7.5 wt %, about 0.5 wt % to about 5 wt %, or about 1 wt % to about 5 wt %. Further, the conductive additive may have a concentration in the second slurry of about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, or about 10 wt %.

Conditions

In general, the electrode active material and the conductive additive in this step may be added to the first slurry in any sequential order or in various portions. Once added, these components are mixed or milled to provide a dispersed second slurry that reduces the particle size of the electrode active material and the conductive additive. Various methods are known in the art to disperse and/or reduce the particle size of the components, such as milling.

In preferred embodiments, a ball mill is used to reduce the particle size of the components.

This step in the method (i.e., step B) may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the electrode active material, the conductive additive, and the first slurry. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

(C) Adding a Second Binder Dissolved in a Second Organic Solvent to the Second Slurry The next step in the method encompasses adding a second binder dissolved in a second organic solvent to the second slurry. Upon addition of the second binder and second organic solvent, the first binder begins to precipitate and/or crystallize from the slurry. There may be a delay between the addition of the second binder to the second slurry and the formation of the precipitate. The delay may be from about 1 to about 5 seconds, or the delay may be as great as a minute, or more.

Second Binder

A second binder dissolved in a second solvent is added to the second slurry. In general, the second binder comprises a fluoropolymer. In some embodiments, the fluoropolymer may contain vinylidene fluoride (VdF) and hexafluoropropylene (HFP) as structural units. Specific examples include homopolymers such as polyvinylidene fluoride (PVdF), polyhexafluoropropylene (PHFP), and binary copolymers such as copolymers of VdF and HFP such as poly (vinylene difluoride-hexafluoropropylene) copolymer (PVdF-HFP), and the like. In some examples, the fluoropolymer may include Poly(vinylidene fluoride-co-hexafluoropropylene).

Generally, the second binder may be present in the second slurry is in an amount of about 1.0% to about 40.0% by weight of the second slurry. In various embodiments, the second binder may be present in the second slurry is in an amount of about 1.0% to about 40.0%, about 1.0% to about 10.0%, about 1.0% to about 15.0%, about 5.0% to about 20.0%, about 10.0% to about 20.0%, from about 15.0% to about 20.0%, from about 20.0% to about 25.0%, from about 20.0% to about 30.0%, from about 20.0% to about 35.0%, from about 20.0% to about 40%, from about 30.0% to about 35.0%, or from about 30.0% to about 40.0%. In an embodiment, the second binder is present in the second slurry is in an amount of about 4% to about 5% by weight.

Second Organic Solvent

A second organic solvent is added with the second binder to the second slurry. The second organic solvent may be a single solvent or a blend of solvents. Generally, the second organic solvent may be the same or different than the first organic solvent. In various embodiments, the second organic solvent may be a non-polar organic solvent or a polar organic solvent. Suitable, non-limiting examples of the solvents are disclosed in Section I above. In an embodiment, the second organic solvent may be isobutyl isobutyrate (IBIB).

Conditions

The addition of the second binder dissolved in the second organic solvent in this step may be added all at once or in various portions. Once added, these components are mixed. Various methods are known in the art to mix a solution in a slurry such as an overhead mixer or a magnetic stirrer.

This step in the method may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the conductive material, the conductive additive, and the first slurry. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

Figure 2:
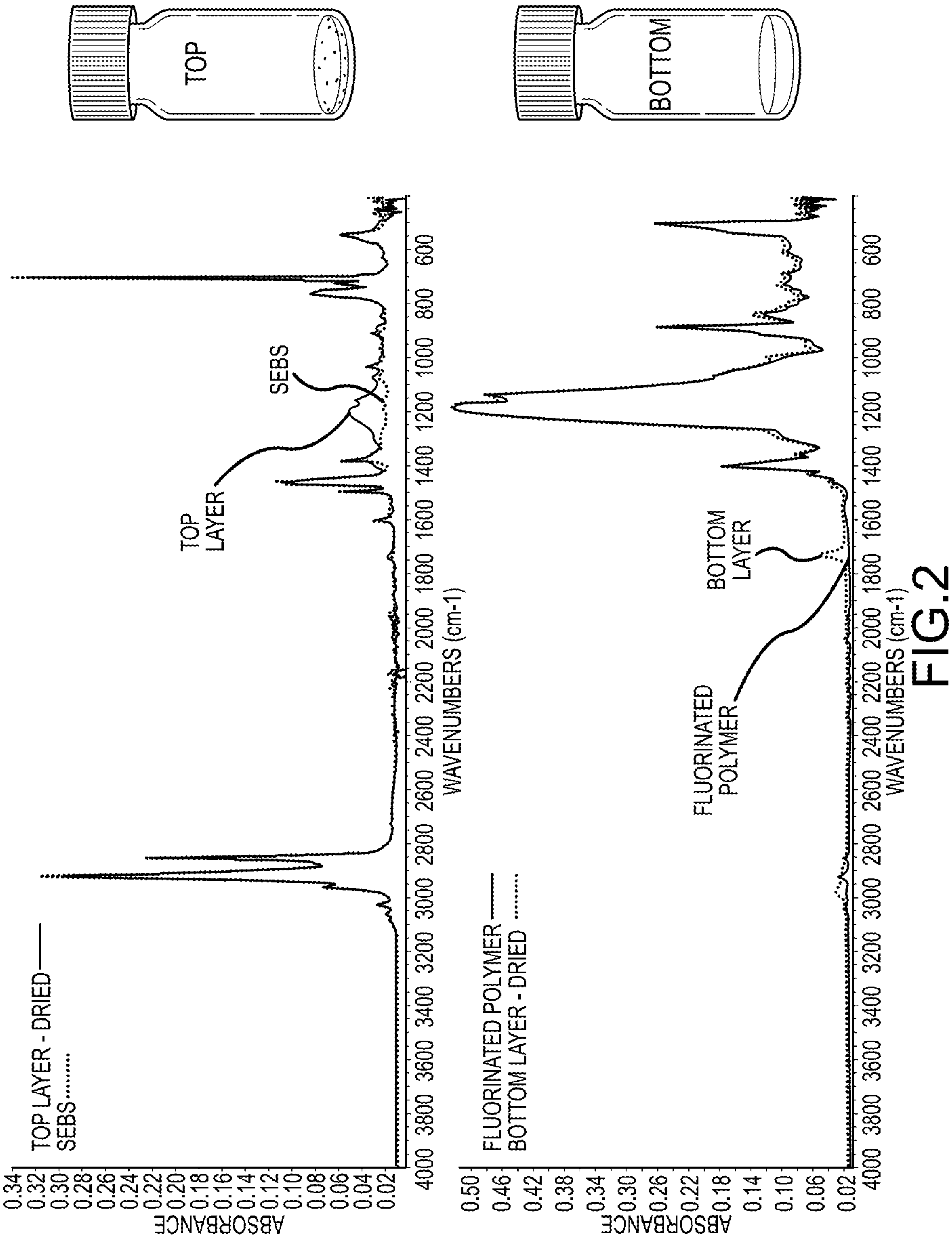
FIG. 2 shows the fourier-transform infrared (FTIR) spectroscopy of each individual layer after the precipitation is completed.

After the addition and incorporation of the second binder dissolved in the second organic solvent, the first binder precipitates as shown in FIG. 1. FIG. 2 shows an example analytical characterization of the precipitated first binder versus the dissolved second binder, wherein the first binder was SEBS and the second binder was Poly(vinylidene fluoride-co-hexafluoropropylene).

III. Third Method for Preparing an Electrode Slurry

Another aspect of the present disclosure provides another method for preparing an electrode slurry. This method comprises adding a second binder to a slurry comprising an electrode active material, a conductive additive, a solid electrolyte, a first binder, and a combination of a first organic solvent and a second organic solvent, wherein the addition of the second binder causes the precipitation of the first binder. The slurry may be coated/cast onto a current collector. Alternately, the slurry may be coated/cast onto a carrier foil.

(A) Preparing a Slurry Comprising an Electrode Active Material, a Conductive Additive, a Solid Electrolyte, a First Binder, and a Combination of the First Organic Solvent and Second Organic Solvent This method initiates by preparing a slurry comprising an electrode active material, a conductive additive, a solid electrolyte, a first binder, and a combination of a first organic solvent and a second organic solvent. The electrode active material, the conductive additive, the solid electrolyte, the first binder, the first organic solvent, and the second organic solvent are described in more detail above in Section II.

The addition of the components in this step may be added all at once, in various portions, or in any sequential order. Once added, these components are milled and/or mixed. Various methods are known in the art to mill or mix these components into a slurry as detailed above in Section II. In preferred embodiments, a ball mill is used to mill the components into a slurry.

This step in the method may be conducted at a temperature that ranges from about 0° C. to about 40° C. In various embodiments, this step may be conducted at a temperature that ranges from about 0° C. to about 40° C., from about 5° C. to about 40° C., from about 10° C. to about 40° C., from about 15° C. to about 40° C., from about 20° C. to about 40° C., from about 25° C. to about 40° C., from about 30° C. to about 40° C., from about 10° C. to about 30° C., or from about 15° C. to about 25° C. In one embodiment, the temperature of this step may be conducted at a temperature about 23° C., about 24° C., about 25° C. (e.g., room temperature). This step typically is conducted under ambient pressure and may also be conducted under an inert atmosphere, for example under nitrogen, argon, or helium.

The duration of this step may vary depending on the amounts and types of the conductive material, the conductive additive, and the first slurry. In general, the duration of this step may range from about 1 minute to 2 hours. In various embodiments, the duration of this step may range from about 1 minute to about 2 hours, from about 5 minutes to about 1 hour, or from about 10 minutes to about 1 hour.

(B) Adding a Second Binder to a Slurry

The next step in the method is to add the second binder to the slurry comprising an electrode active material, a conductive additive, a solid electrolyte, a first binder, and a combination of a first organic solvent and a second organic solvent. As the addition of the second binder is occurring, the first binder begins to precipitate from slurry. The electrode active material, the conductive additive, the solid electrolyte, the first binder, the second binder, the first organic solvent, the second organic solvent, and slurries comprising the same are described in more detail in Section II above.

Conditions

The second binder may be added all at once or in various portions. Once the second binder is added, the components are mixed. Various methods are known in the art to mix the second binder in a slurry such as a high-speed mixer.

This step may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the conductive material, the conductive additive, and the first slurry. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

IV. Fourth Method of Preparing an Electrode Slurry

In an additional aspect, the present disclosure provides a method of preparing an electrode slurry. The electrode slurry may be an anode slurry or a cathode slurry. This method comprises combining a solid electrolyte with a first binder dissolved in a first organic solvent and milling the combination to form a first slurry; combining the first slurry with an electrode active material and a conductive additive to form a second slurry; adding a second binder dissolved in a second organic solvent to the second slurry; casting the second slurry onto a carrier foil; coating a third slurry on top of the second slurry, thereby forming an interface between the second slurry and the third slurry, the third slurry being devoid of the second binder; and drying the second slurry and the third slurry; wherein the dried third slurry comprises the second binder. Once the first and second slurries dry, they form an electrode layer. When the third slurry dries, it forms a separator layer.

(A) Combining a Solid Electrolyte With a First Binder Dissolved in a First Organic Solvent and Milling (Mixing) the Combination to Form a First Slurry This method commences by preparing a first slurry. This first slurry includes a solid electrolyte, a first binder, and a first organic solvent. Once these components are added, the components are milled (mixed) to form a first slurry.

The Solid Electrolyte, the First Binder, and the First Organic Solvent

The solid electrolyte, the first binder, and the first organic solvent are described in more detail above in Section I. Once these components are added, mixed and/or milled, the first slurry is prepared.

In general, the solid electrolyte, the first binder, and the first solvent in this step may be added in any sequential order or in various portions. Once added, these components are milled to provide a dispersed solution that reduces the particle size of the solid electrolyte to form the first slurry. Various methods are known in the art to disperse and reduce the particle size of the solid electrolyte.

This step in the method may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the solid electrolyte, the first binder, and the first solvent. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

(B) Combining the First Slurry With an Electrode Active Material and a Conductive Additive to Form a Second Slurry The next step in the method includes combining the first slurry with an electrode active material and a conductive additive to form a second slurry. The conductive additive and the electrode active material are described in more detail in Section I above.

Conditions

In general, the conductive material and the conductive additive in this step may be added in any sequential order or in various portions. Once added, these components are mixed and/or milled to provide a dispersed second slurry that reduces the particle size of the electrode active material and the conductive additive. Various methods are known in the art to mix and/or mill the electrode active material the conductive additive.

This step in the method may be conducted at a temperature that ranges from about 0° C. to about 40° C. In various embodiments, this step may be conducted at a temperature that ranges from about 0° C. to about 40° C., from about 10° C. to about 30° C., from about 20° C. to about 30° C., or from about 15° C. to about 25° C. In one embodiment, the temperature of this step may be conducted at a temperature of about 23° C., about 24° C., or about 25° C. (e.g., room temperature). This step typically is conducted under ambient pressure and may also be conducted under an inert atmosphere, for example under nitrogen, argon, or helium.

The duration of this step may vary depending on the amounts and types of the conductive material, the conductive additive, and the first slurry. In general, the duration of this step may range from about 1 minute to about 2 hours. In various embodiments, the duration of this step may range from about 1 minute to about 2 hours, from about 5 minutes to about 1 hour, or from about 10 minutes to about 1 hour.

(C) Adding a Second Binder Dissolved in a Second Organic Solvent to the Second Slurry The next step in the method encompasses adding a second binder dissolved in a second organic solvent to the second slurry. Upon addition of the second binder and second organic solvent, the first binder begins to precipitate from the slurry. The second binder and the second organic solvent are described in more detail in Section I above.

(D) Casting/Coating the Second Slurry Onto a Carrier Foil or a Current Collector The next step in the process encompasses casting the second slurry onto a carrier foil or a current collector. Casting, coating, or application of the second slurry may be applied through various means. For example, the second slurry may be applied using a drawdown bar, a roller, a knife, a paint brush, a sprayer, dipping, tape casting, or other methods known to the skilled artisan. Also, more than one application of the second slurry may be applied forming a multi-layered coating.

The carrier foil may comprise copper, nickel, stainless steel, aluminum, or carbon fiber. In some embodiments, the carrier foil may be coated with carbon.

The current collector may comprise one or more of copper, aluminum, nickel, titanium, stainless steel, magnesium, iron, zinc, indium, germanium, silver, platinum, or gold. In some embodiments, the current collector may have a thickness of about 5 μm to about 10 μm. In some embodiments, the current collector includes a carbon coating. In preferred embodiments, the current collector comprises copper, nickel, and/or steel.

(E) Coating a Third Slurry on Top of the Second Slurry, Thereby Forming an Interface Between the Second Slurry and the Third Slurry, the Third Slurry Being Devoid of the Second Binder The next step in the method encompasses coating a third slurry on top of the second slurry. The physical contact between the second slurry and the third slurry defines an interface between the second slurry and the third slurry.

Casting or application of the third slurry may be applied through various means. For example, the third slurry may be applied using a drawdown bar, a roller, a knife, a paint brush, a sprayer, dipping, or other methods known to the skilled artisan. Also, more than one application of the second slurry may be applied forming a multi-layered coating.

The third slurry may include a solid-state electrolyte material. The solid electrolyte material may include one or more of $Li_3PS_4$, $Li_4P_2S_6$, $Li_7P_3S_{11}$, $Li_{10}GeP_2S_{12}$, $Li_{10}SnP_2S_{12}$. In a further embodiment, the solid electrolyte may include an argyrodite electrolyte, such as one or more of a $Li_6PS_5Cl$, $Li_6PS_5Br$, $Li_6PS_5I$ or expressed by the formula $Li_{7-y}PS_{6-y}X_y$ where "X" represents at least one halogen and/or at least one pseudo-halogen, and where $0<y\leq 2.0$ and where the halogen may include one or more of F, Cl, Br, I, and the pseudo-halogen may include one or more of N, NH, $NH_2$, NO, $NO_2$, $BF_4$, $BH_4$, $AlH_4$, CN, and SCN. In yet another embodiment, the solid-state electrolyte material be expressed by the formula $Li_{8-y-z}P_2S_{9-y-z}X_yW_z$ (where "X" and "W" represents at least one halogen and/or at least one pseudo-halogen and where $0\leq y\leq 1$ and $0\leq z\leq 1$) and where the halogen may include one or more of F, Cl, Br, I, and the pseudo-halogen may include one or more of N, NH, $NH_2$, NO, $NO_2$, $BF_4$, $BH_4$, $AlH_4$, CN, and SCN.

The third slurry may further include a binder. The binder may include one or more of a thermoplastic elastomer(s). Suitable non-limiting examples of thermoplastic elastomers include styrene-butadiene rubber (SBR), styrene-butadiene-styrene block copolymer (SBS), styrene-isoprene block copolymer (SIS), styrene-ethylene-butylene-styrene block copolymer (SEBS), polyacrylonitrile (PAN), nitrile-butylene rubber (NBR), polybutadiene, polyisoprene, poly (methacrylate) nitrile-butadiene rubber (PMMA-NBR) and the like. In an embodiment, the binder is a styrene-ethylene-butylene-styrene block copolymer (SEBS).

The third slurry may include a third organic solvent. The third organic solvent may be a single solvent or a blend of solvents. Generally, the third organic solvent may be the same or different than the first organic solvent or the second organic solvent. In various embodiments, the third organic solvent may be a non-polar organic solvent or a polar organic solvent. Suitable, non-limiting examples of the solvents are disclosed in Section I above. In an embodiment, the third organic solvent may be isobutyl isobutyrate (IBIB).

(F) Drying the Second Slurry and the Third Slurry

The next step in the method encompasses drying the second and third slurry which is on the carrier foil. This step comprises removing the solvent from the second and third slurries using evaporation, a stream of gas such as air or an inert atmosphere, elevated temperature, vacuum, or a combination thereof. Other methods are known in the art to adequately remove the solvent.

Figure 3:
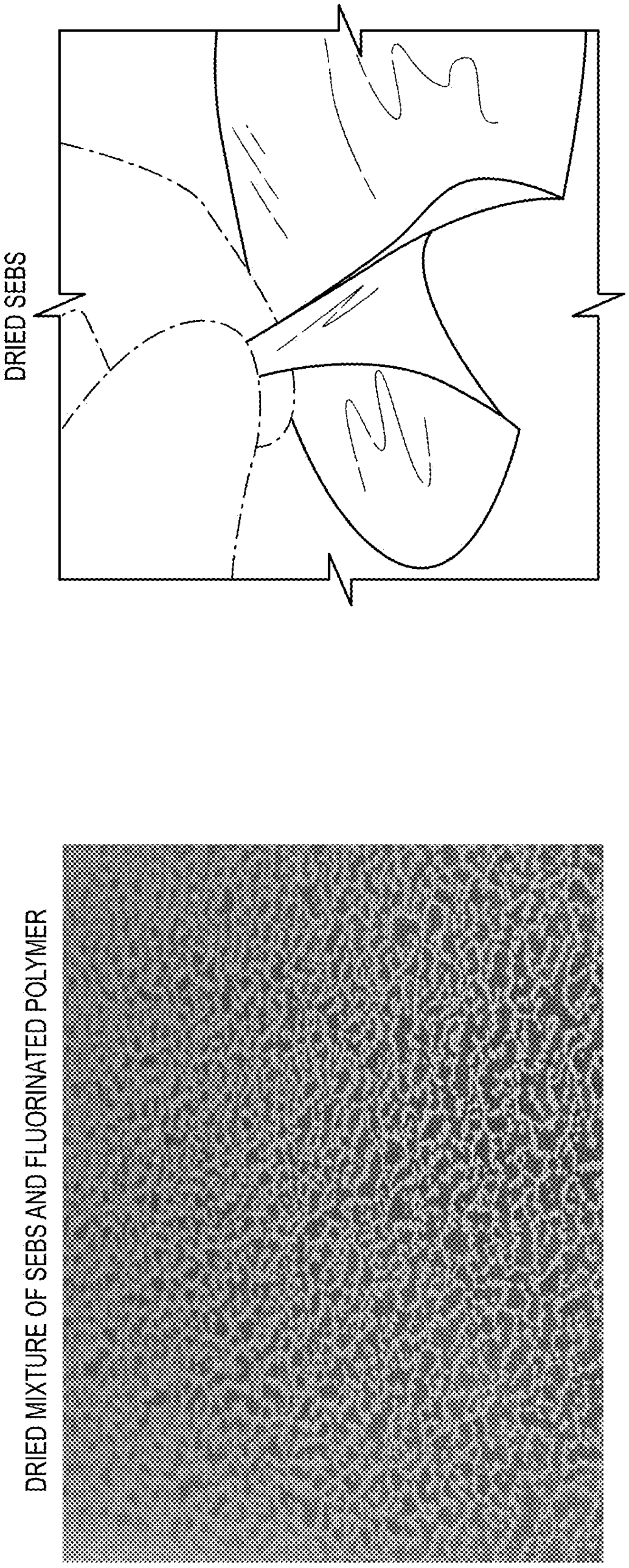
FIG. 3 shows a comparison of the precipitated and dried SEBS from the mixture of SEBS and Poly(vinylidene fluoride-co-hexafluoropropylene) in isobutyl isobutyrate versus the coated and dried SEBS in isobutyl isobutyrate.

As the second slurry and the third slurry are dried, the first and the second solvents are wicked from the second slurry to the third slurry. Additionally, the second binder is soluble in the first and second organic solvents and is transported or carried from the second slurry layer to the third slurry layer leaving the first binder in the second slurry layer. When the slurry is then cast onto a carrier foil or a current collector and dried, the first binder no longer clings to the surface of the particles but instead forms a dispersed network (like a spider web) which secures the particles in place but allows for greater particle-to-particle contact between the various materials contained in the composite. FIG. 3 shows the spider web configuration of SEBS from a mixture of SEBS and Poly(vinylidene fluoride-co-hexafluoropropylene). This allows for a reduction of the overall resistance of the electrode layers which, in turn, increase the electrochemical performance of any battery cell that uses this binder combination in the electrode.

V. Compositions

Still another aspect of the present disclosure is a composition. The compositions comprise an electrode layer comprising a precipitated binder and a dissolved binder, a separator layer in physical contact with the electrode layer comprising the precipitated binder and the dissolved binder; and an interface formed between the electrode layer and the separator layer, wherein a concentration of the dissolved binder in the electrode layer and the separator layer defines a gradient, the gradient comprising a maximum concentration of the dissolved binder at the interface. The electrode layer may be an anode layer or a cathode layer. The compositions may be used in electrochemical cells, including solid-state electrochemical cells.

The inventors surprisingly found that within each individual layer of an electrochemical cell, the concentration of the binder(s) was not constant throughout the height of the cell. Specifically, the amount of binder(s) in the bottom of a layer (the side of the layer adjacent to the current collector or carrier foil) had a lower concentration than the opposite surface (the side furthest from the current collector or carrier foil). By creating a binder concentration gradient where the concentration of the binder(s) at the surface interface between two layers of an electrochemical cell is the highest, a higher degree of surface-to-surface contact between the layers may be achieved without increasing the total binder concentration.

(A) Electrode Layer

The composition comprises an electrode layer. The electrode layer comprises a precipitated binder. The precipitated binder comprises one or more of a thermoplastic elastomer. Suitable non-limiting examples of thermoplastic elastomer may be styrene-butadiene rubber (SBR), styrene-butadiene-styrene block copolymer (SBS), styrene-isoprene block copolymer (SIS), styrene-ethylene-butylene-styrene block copolymer (SEBS), polyacrylonitrile (PAN), nitrile-butylene rubber (NBR), polybutadiene, polyisoprene, poly (methacrylate) nitrile-butadiene rubber (PMMA-NBR) and the like. In an embodiment, the first binder is a styrene-ethylene-butylene-styrene block copolymer (SEBS).

The electrode layer further comprises a dissolved binder. The dissolved binder comprises a fluororesin or a fluoropolymer. The fluororesin or fluoropolymer contains vinylidene fluoride (VdF) and hexafluoropropylene (HFP) as structural units. Specific examples include homopolymers as such polyvinylidene fluoride (PVdF), polyhexafluoropropylene (PHFP), and binary copolymers such as copolymers of VdF and HFP such as poly (vinylene difluoride-hexafluoropropylene) copolymer (PVdF-HFP), and the like.

The electrode layer further comprises an electrode active material and a solid electrolyte or a conductive additive. The electrode active material, the solid electrolyte, and conductive additives are described in more detail in Section I.

The electrode layer may comprise a high porosity region. The high porosity region of the electrode layer may have a porosity from about 30% to about 50%, such as from about 30% to about 35%, about 30% to about 40%, about 30% to about 45%, about 30% to about 50%, about 35% to about 50%, about 40% to about 50%, or about 45% to about 50%.

(B) A Separator Layer in Physical Contact With the Electrode Layer Comprising a Precipitated Binder Separator Layer The separator layer is in physical contact with the electrode layer. The separator comprises an electrolyte, suitable examples of which are provided in Section I above.

The separator layer may comprise a high porosity region. The high porosity region of the separator layer may have a porosity from about 30% to about 50%, such as from about 30% to about 35%, about 30% to about 40%, about 30% to about 45%, about 30% to about 50%, about 35% to about 50%, about 40% to about 50%, or about 45% to about 50%.

(C) An Interface Formed Between the Electrode Layer and the Separator Layer

An interface is formed between the electrode layer and the separator layer wherein a concentration of the precipitated binder in the electrode layer and the separator layer defines a gradient, the gradient comprising a maximum concentration of the first binder at the interface.

The precipitated binder concentration gradient and the dissolved binder concentration gradient may define a continual binder gradient across the interface. The continual binder gradient across the gradient comprises no discontinuity in the gradient at the interface. Stated differently, continual binder gradient across the gradient also comprises substantially similar concentration immediately on either side of the interface, while there is also a gradient across the interface. Thus, in some examples, the first binder concentration at an area of the electrode layer close to the interface (e.g., within 1 μm of the electrode layer) may be substantially the same (i.e., ±5%) as the precipitated binder concentration in the separator layer at an area close to the interface. This continual binder concentration gradient may extend from the first side of the electrode layer to the second side of the separator layer.

Generally, the concentration of the precipitated binder in the electrode layer is ±5% or less by weight the concentration of the dissolved binder in the separator layer at the interface. In various embodiments, the concentration of the precipitated binder in the electrode layer is ±5%, 4%, 3%, 2%, 1%, 0.9%, 0.8%, 0.7%, 0.6%, 0.5%, 0.4%, 0.3%, 0.2%, 0.1%, 0.09%, 0.08%, 0.07%, 0.06%, 0.05%, 0.04%, 0.03%, 0.02%, 0.01%, or less than 0.01% by weight the concentration of the dissolved binder in the separator layer at the interface.

The interface may comprise a low porosity region. The low porosity region may have a porosity from about 5% to about 30%, such as from about 5% to about 10%, about 5% to about 15%, about 5% to about 20%, about 5% to about 25%, about 5% to about 30%, about 10% to about 30%, about 15% to about 30%, about 20% to about 30%, or about 25% to about 30%.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

The term "about" will be understood by persons of ordinary skill in the art and will vary to some extent on the context in which it is used. As used herein when referring to a measurable value such as an amount, a temporal duration, and the like, the term "about" is meant to encompass variations of ±10%, including ±5%, ±1%, and ±0.1% from the specified value, as such variations are appropriate to perform the disclosed methods.

In this disclosure, "comprises," "comprising," "containing," and "having" and the like may have the meaning ascribed to them in U.S. Patent Law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. In this specification when using an open-ended term, like "comprising" or "including," it is understood that direct support should be afforded also to "consisting essentially of" language as well as "consisting of" language as if stated explicitly and vice versa.

It should be understood that within the meaning of this disclosure, the phrase "first binder" and "second binder" may refer to a single binder or to a mixture of binders. That is, the label "first" or "second" should not be construed to limit the referenced binder to a single species. Moreover, phrases such as "the binder" or "a binder" should be construed to also refer to the first binder and/or the second binder.

As various changes could be made in the above-described methods without departing from the scope of the invention, it is intended that all matter contained in the above description and in the examples given below, shall be interpreted as illustrative and not in a limiting sense.

ENUMERATED EMBODIMENTS

Embodiment 1: A method for preparing an electrode slurry for use in an electrochemical cell comprising:
- combining a solid electrolyte with a first binder dissolved in a first organic solvent to form a first slurry;
- combining the first slurry with an electrode active material and a conductive additive to form a second slurry; and
- adding a second binder dissolved in a second organic solvent to the second slurry, wherein the addition of the second binder yields precipitation of the first binder.

Embodiment 2: A method for preparing an electrode slurry for use in an electrochemical cell comprising:
- adding a second binder to a slurry comprising an electrode active material, a conductive additive, a solid electrolyte, a first binder, and a combination of a first organic solvent and a second organic solvent,
- herein the addition of the second binder causes the precipitation of the first binder.

Embodiment 3: A method for preparing an electrode slurry for use in an electrochemical cell comprising:
- combining a solid electrolyte with a first binder dissolved in a first organic solvent the combination to form a first slurry;
- combining the first slurry with an electrode active material and a conductive additive to form a second slurry;
- adding a second binder dissolved in a second organic solvent to the second slurry;
- casting the second slurry onto a current collector;
- coating a third slurry on top of the second slurry, thereby forming an interface between the second slurry and the third slurry, the third slurry being devoid of the second binder; and
- drying the second slurry and the third slurry;
- wherein the addition of the second binder causes the first binder to precipitate in the second slurry, and
- wherein the dried third slurry comprises the second binder.

Embodiment 4: The method of embodiment 3, wherein the current collector comprises copper, nickel, stainless steel, lithium alloys, or carbon fiber.

Embodiment 5: The method of any one of embodiments 1-4, wherein the first organic solvent and the second organic solvent are the same or different.

Embodiment 6: The method of any one of embodiments 1-5, wherein the first organic solvent comprises a polar organic solvent.

Embodiment 7: The method of embodiment 6, wherein the first organic solvent comprises isobutyl isobutyrate.

Embodiment 8: The method of any one of embodiments 1-5, wherein the first organic solvent comprises a non-polar organic solvent.

Embodiment 9: The method of any one of embodiments 1-8, wherein the second organic solvent comprises a polar organic solvent.

Embodiment 10: The method of any one of embodiments 1-9, wherein the second organic solvent comprises a non-polar organic solvent.

Embodiment 11: The method of any one of embodiments 1-10, wherein the solid electrolyte comprises an oxide electrolyte, an oxysulfide electrolyte, a sulfide electrolyte, a halide electrolyte, or a nitride electrolyte, or a combination thereof.

Embodiment 12: The method of any one of embodiments 1-11, wherein cathode active material comprises one or more of a coated metal oxide, an uncoated metal oxide, a coated metal sulfide, an uncoated metal sulfide, elemental sulfide, and a metal fluoride.

Embodiment 13: The method of any one of embodiments 1-12, wherein the conductive additive comprises a conductive carbon material.

Embodiment 14: The method of any one of embodiments 1-13, wherein the first binder comprises one or more of a thermoplastic elastomer(s).

Embodiment 15: The method of any one of embodiments 1-14, wherein the second binder comprises a fluororesin.

Embodiment 16: The method of embodiment 15, wherein the fluororesin comprises vinylidene fluoride (VdF) and hexafluoropropylene (HFP) structural units.

Embodiment 17: The method of any one of embodiments 1-16, wherein the first binder in the first solvent has a concentration ranging from about 1.0 wt % to about 40 wt %.

Embodiment 18: The method of any one of embodiments 1-17, wherein the second binder in the second solvent has a concentration ranging from about 1.0 wt % to about 40 wt %.

Embodiment 19: The method of anyone of claims 1-18, further comprising milling the combined solid electrolyte and the first binder.

Embodiment 20: A composition comprising:
- an electrode layer comprising a first binder;
- a separator layer in physical contact with the electrode layer comprising the first binder; and
- an interface formed between the electrode layer and the separator layer,
- wherein a concentration of the first binder in the electrode layer and the separator layer defines a gradient, the gradient comprising a maximum concentration of the first binder at the interface.

Embodiment 21: The composition of embodiment 20, wherein the first binder comprises one or more of a thermoplastic elastomer.

Embodiment 22: The composition of embodiment 20 or 21, wherein the cathode layer and separator layer have a high porosity region and the interface has a low porosity region.

Embodiment 23: The composition of embodiment 22, wherein the high porosity region has a porosity from about 30% to about 50%.

Embodiment 24: The composition of embodiment 22 or 23, wherein the low porosity region has a porosity from about 5% to about 30%.

Embodiment 25: The composition of any one of embodiments 20-24, wherein the electrode layer comprises a cathode active material.

Embodiment 26: The composition of embodiment 25, wherein the electrode layer further comprises a solid-state electrolyte or a conductive additive.

Embodiment 27: The composition of any one of embodiments 20-26, wherein the separator layer further comprises a solid electrolyte material.

Embodiment 28: The composition of any one of embodiments 20-27, wherein the electrode layer further comprises a dissolved binder.

Embodiment 29: The composition of any one of embodiments 20-28, wherein the separator layer further comprises a dissolved binder.

Embodiment 30: A method for preparing an electrode slurry for use in an electrochemical cell comprising:

combining one or more electrode components with a first binder dissolved in a first organic solvent to form a first slurry, the one or more electrode components comprising an electrode active material, a solid electrolyte material, a conductive additive, or a combination thereof; and adding a second binder dissolved in a second organic solvent to the first slurry, wherein the addition of the second binder yields precipitation of the first binder.

Embodiment 31: A method for preparing an electrode slurry for use in an electrochemical cell comprising:

combining one or more electrode components with a first binder dissolved in a first organic solvent to form a first slurry, the one or more electrode components comprising an electrode active material, a solid electrolyte material, a conductive additive, or a combination thereof;

combining the first slurry with one or more additional electrode components to form a second slurry; and adding a second binder dissolved in a second organic solvent to the second slurry, wherein the addition of the second binder yields precipitation of the first binder.

Embodiment 32: The method of any one of embodiments 30-31, wherein the first organic solvent and the second organic solvent are the same or different.

Embodiment 33: The method of any one of embodiments 30-32, wherein the first organic solvent comprises a polar organic solvent.

Embodiment 34: The method of embodiment 33, wherein the first organic solvent comprises isobutyl isobutyrate.

Embodiment 35: The method of any one of embodiments 30-32, wherein the first organic solvent comprises a non-polar organic solvent.

Embodiment 36: The method of any one of embodiments 30-35, wherein the second organic solvent comprises a polar organic solvent.

Embodiment 37: The method of any one of embodiments 30-35, wherein the second organic solvent comprises a non-polar organic solvent.

Embodiment 38: The method of any one of embodiments 30-37, wherein the solid electrolyte comprises an oxide electrolyte, an oxysulfide electrolyte, a sulfide electrolyte, a halide electrolyte, or a nitride electrolyte, or a combination thereof.

Embodiment 39: The method of any one of embodiments 30-38, wherein cathode active material comprises one or more of a coated metal oxide, an uncoated metal oxide, a coated metal sulfide, an uncoated metal sulfide, elemental sulfide, and a metal fluoride.

Embodiment 40: The method of any one of embodiments 30-39, wherein the conductive additive comprises a conductive carbon material.

Embodiment 41: The method of any one of embodiments 30-40, wherein the first binder comprises one or more of a thermoplastic elastomer(s).

Embodiment 42: The method of any one of embodiments 30-41, wherein the second binder comprises a fluororesin.

Embodiment 43: The method of embodiment 42, wherein the fluororesin comprises vinylidene fluoride (VdF) and hexafluoropropylene (HFP) structural units.

Embodiment 44: The method of any one of embodiments 30-43, wherein the first binder in the first solvent has a concentration ranging from about 1.0 wt % to about 40 wt %.

Embodiment 45: The method of any one of embodiments 30-44, wherein the second binder in the second solvent has a concentration ranging from about 1.0 wt % to about 40 wt %.

Embodiment 46: The method of any one of embodiments 30-45, further comprising milling the combined solid electrolyte and the first binder.

Embodiment 47: An electrochemical cell made by the method of any one of embodiments 1-19 or 30-46.

Embodiment 48: An electrochemical cell comprising:

a current collector;

an electrode layer having a high porosity region; and a separator layer in physical contact with the electrode layer, the separator layer having a high porosity region;

wherein the electrode layer and the separator layer are in physical contact at an interface, and the interface comprises a low porosity region.

EXAMPLES

Example 1

A study was done to compare a composition comprising an anode layer and a separator layer comprising two binders that are both soluble in solution with a similar composition comprising an insoluble binder as described herein.

First, into two separate round bottom flasks was prepared a 15 wt % solution of SEBS in isobutyl butyrate (IBIB) and Poly(vinylidene fluoride-co-hexafluoropropylene) in isobutyl butyrate. A mixture of Poly(vinylidene fluoride-co-hexafluoropropylene) in IBIB and SEBS in IBIB was prepared, mixed, and cast on a carrier foil. The Poly(vinylidene fluoride-co-hexafluoropropylene) and SEBS were present in a weight ratio of 9:6. After solvent removal and drying, an image was obtained of the precipitated SEBS in the mixture as shown in FIG. 3 (left). In contrast, a similar mixture of IBIB and SEBS was cast and is shown in FIG. 3 (right). As may be seen in the figures, the coating including the Poly (vinylidene fluoride-co-hexafluoropropylene) forms a network pattern, which is expected correlate to the distribution of the binder in the electrode layer.

Figure 4:
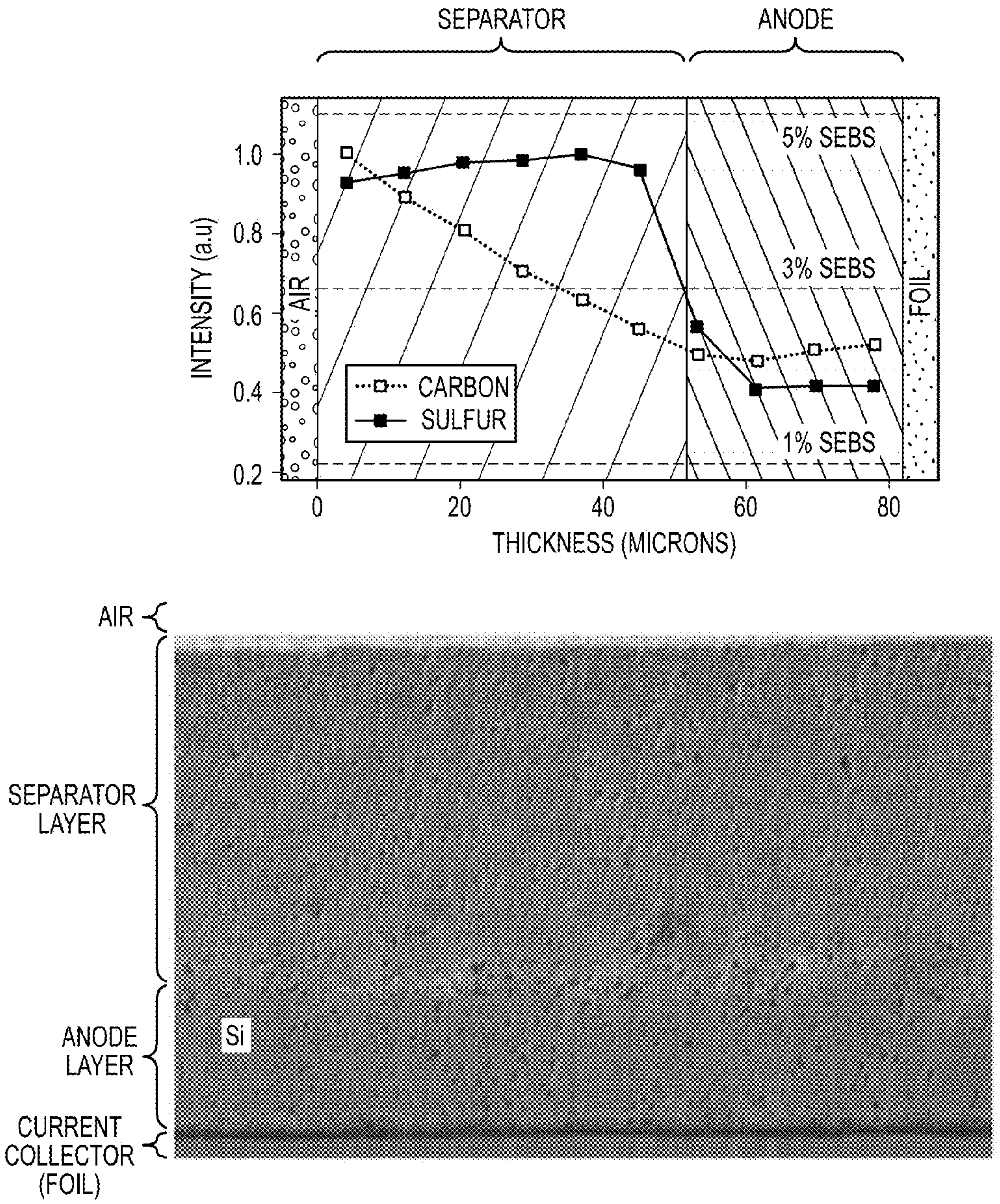
FIG. 4 shows a chart (top) depicting the concentration of carbon and sulfur in a separator layer and an anode layer, and a SEM image of the cathode/separator layer (bottom).

An anode slurry comprising Poly(vinylidene fluoride-co-hexafluoropropylene) in IBIB was coated onto carrier foil and a separator slurry was coated on the wet anode layer. FIG. 4 shows a chart depicting the concentration of carbon and sulfur in the separator layer (yellow) and the anode layer (blue). FIG. 4 also shows a SEM image of the anode/separator layer. The porosity is shown as small darker spots which are void spaces. As may be seen from the SEM image in FIG. 4, the porosity from the top of the composition to the bottom is uniform. Additionally, the concentration of the carbon shows that the binder migrates across the anode/separator interface, thereby forming a continuous binder concentration gradient.

Figure 5:
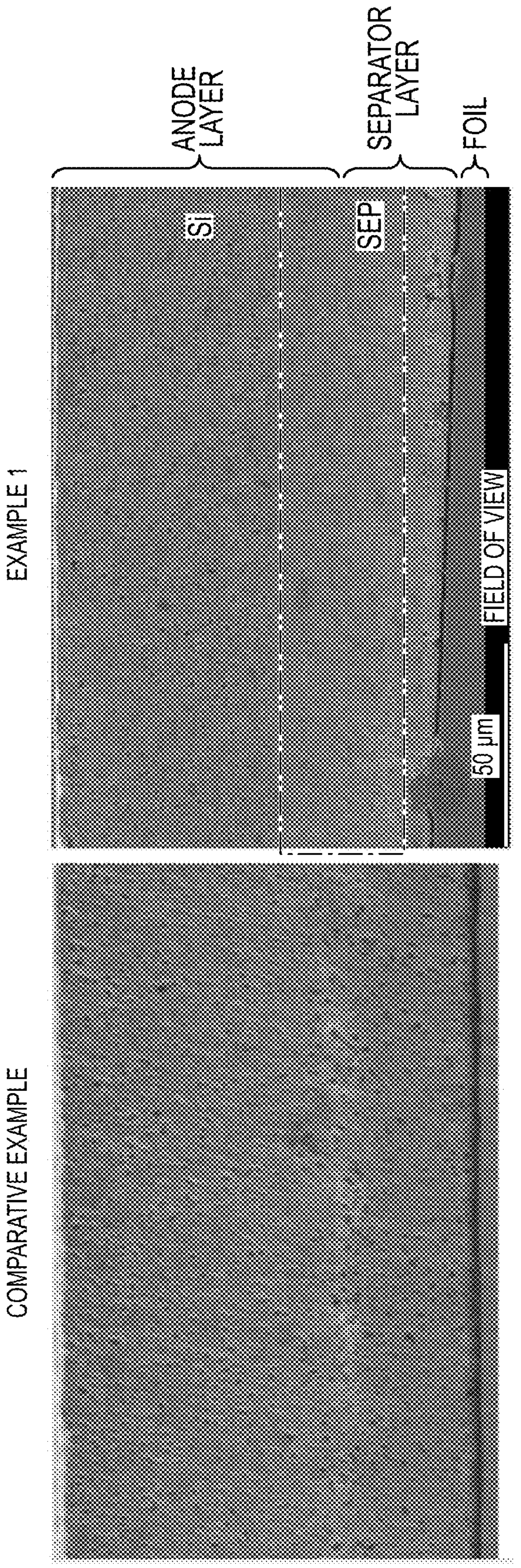
FIG. 5 shows SEM images of a composition made using a single binder (left) and a composition made using a first binder and a second binder as described herein (right).
Figure 6:
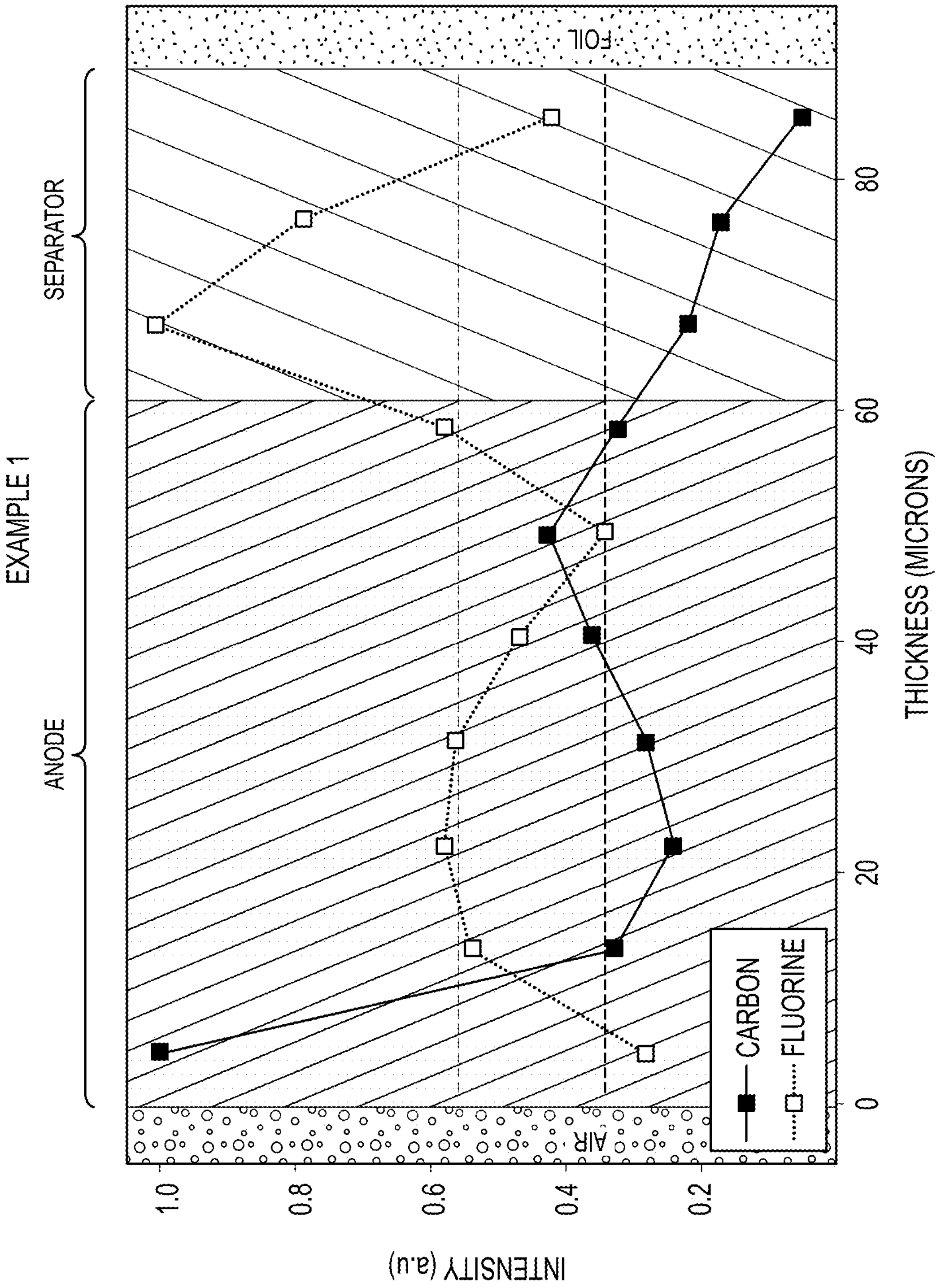
FIG. 6 shows a chart depicting the concentration of carbon and fluorine in an anode layer and a separator layer.

Next, the anode layer comprising Poly(vinylidene fluoride-co-hexafluoropropylene) and SEBS in IBIB was coated on the carrier foil. The separator slurry was coated on top of the anode layer, and both layers were dried. All of the binder was in the anode layer but as the two wet layers dried, the Poly(vinylidene fluoride-co-hexafluoropropylene) binder migrated from the anode, across the anode/separator interface, and permeated the separator layer. This caused a continuous binder gradient across the interface. FIG. 5 shows the comparison in the SEM of the binder gradient produced using Poly(vinylidene fluoride-co-hexafluoropropylene) alone (labeled "comparative example") and the binder gradient produced using Poly(vinylidene fluoride-co-hexafluoropropylene) and SEBS (labeled "Example 1"). Moving from the bottom of the image to the top in FIG. 5, Example 1 shows a shift from a high porosity region to a low porosity region (highlighted in the red boxed areas) and then back to high porosity. This change in porosity results from the movement and buildup of binder at the interface. FIG. 6 shows a comparison of the distribution of carbon and fluorine in the layers comprising Poly(vinylidene fluoride-co-hexafluoropropylene) and SEBS. The only source of fluorine is from the Poly(vinylidene fluoride-co-hexafluoropropylene) while both binders contain carbon.

Example 2

Figure 7:
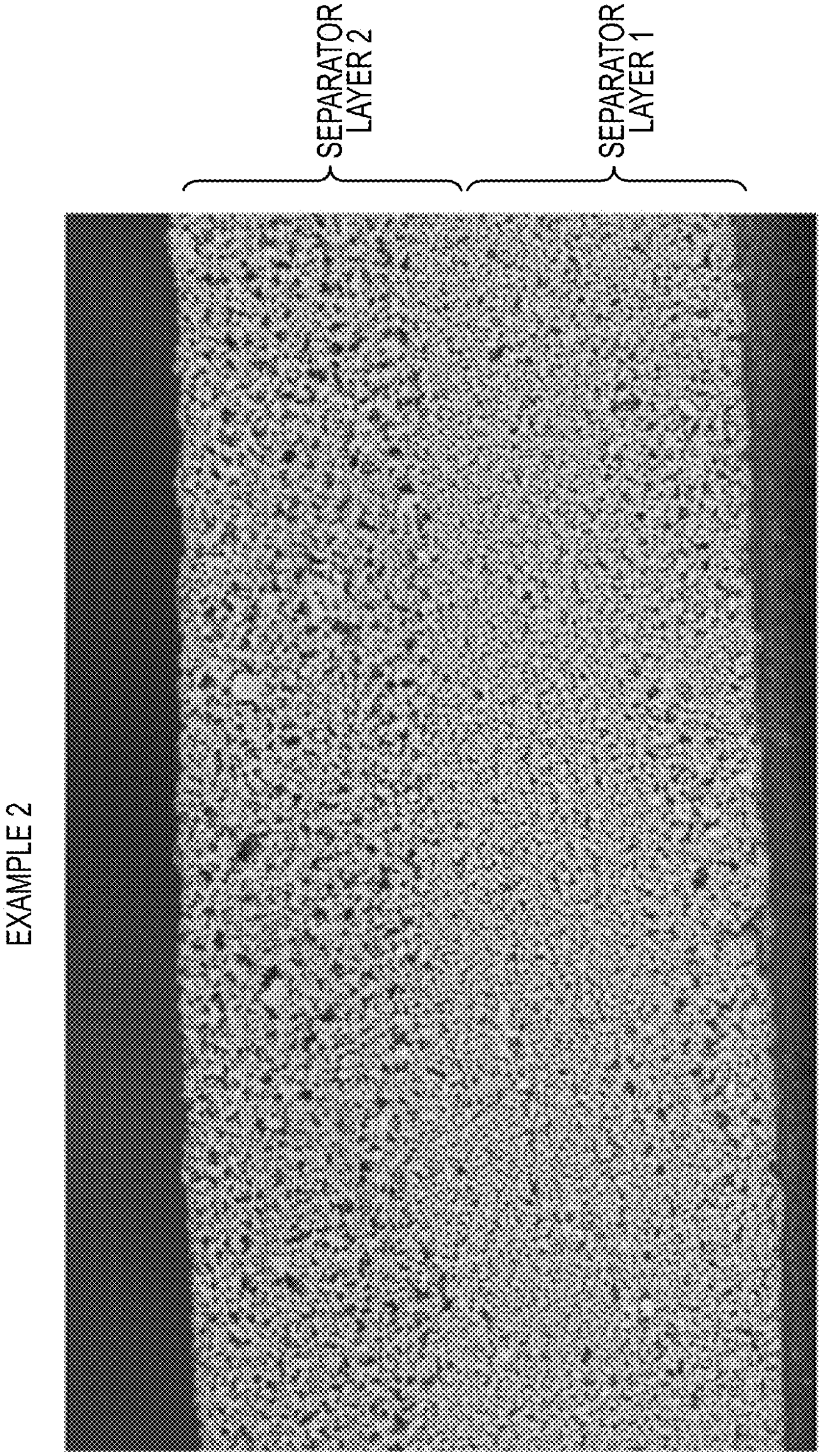
FIG. 7 shows SEM images of two separator layers (i.e., a separator/separator bilayer) formed using the methods of the present disclosure.

A first separator slurry comprising Poly(vinylidene fluoride-co-hexafluoropropylene) in IBIB was coated onto carrier foil and a second separator slurry comprising Polyethylene Vinyl Acetate (PEVA) was coated on the wet first separator layer, forming a separator/separator bilayer which was subsequently dried. As with Example 1, as the two wet separator layers dried, the binder in the bottom layer, Poly(vinylidene fluoride-co-hexafluoropropylene), migrated towards and across the separator/separator interface, and permeated the top separator layer. This caused a continuous binder gradient across the interface. The Poly(vinylidene fluoride-co-hexafluoropropylene) (PVDF-HFP) dissolved in solvent from the bottom layer then mixes with the Polyethylene Vinyl Acetate (PEVA) dissolved in solvent from the top layer. This mixing of the two binders causes the PEVA to start precipitating out of solution. The precipitation of binder starts to fill the spaces which allowed the binders to move, restricting the upward progression of the binder from the bottom layer (the PVDF-HFP). This precipitation effect causes the build up of both binder at or near the interface between the two coated separator layers resulting in a low porosity, high fluorine content, and increased adhesion between the two coated layers. FIG. 7 shows a SEM image of the separator/separator bilayer. The porosity is shown as small darker spots which are void spaces, as may be seen from the SEM image in FIG. 7.

Moving from the bottom of the image to the top in FIG. 7, a shift from a high porosity region to a low porosity region and then back to high porosity can be seen. This change in porosity results from the movement and buildup of binder at the interface.

Figure 8:
FIG. 8 shows an energy dispersive X-ray spectroscopy (EDS) analysis of the separator/separator bilayer of FIG. 7. The lighter regions correspond to the presence of fluorine atoms.

FIG. 8 shows the distribution of fluorine in the separator/separator bilayer as measured by energy-dispersive X-ray spectroscopy (EDS). The only source of fluorine is from the Poly(vinylidene fluoride-co-hexafluoropropylene).

Figure 9:
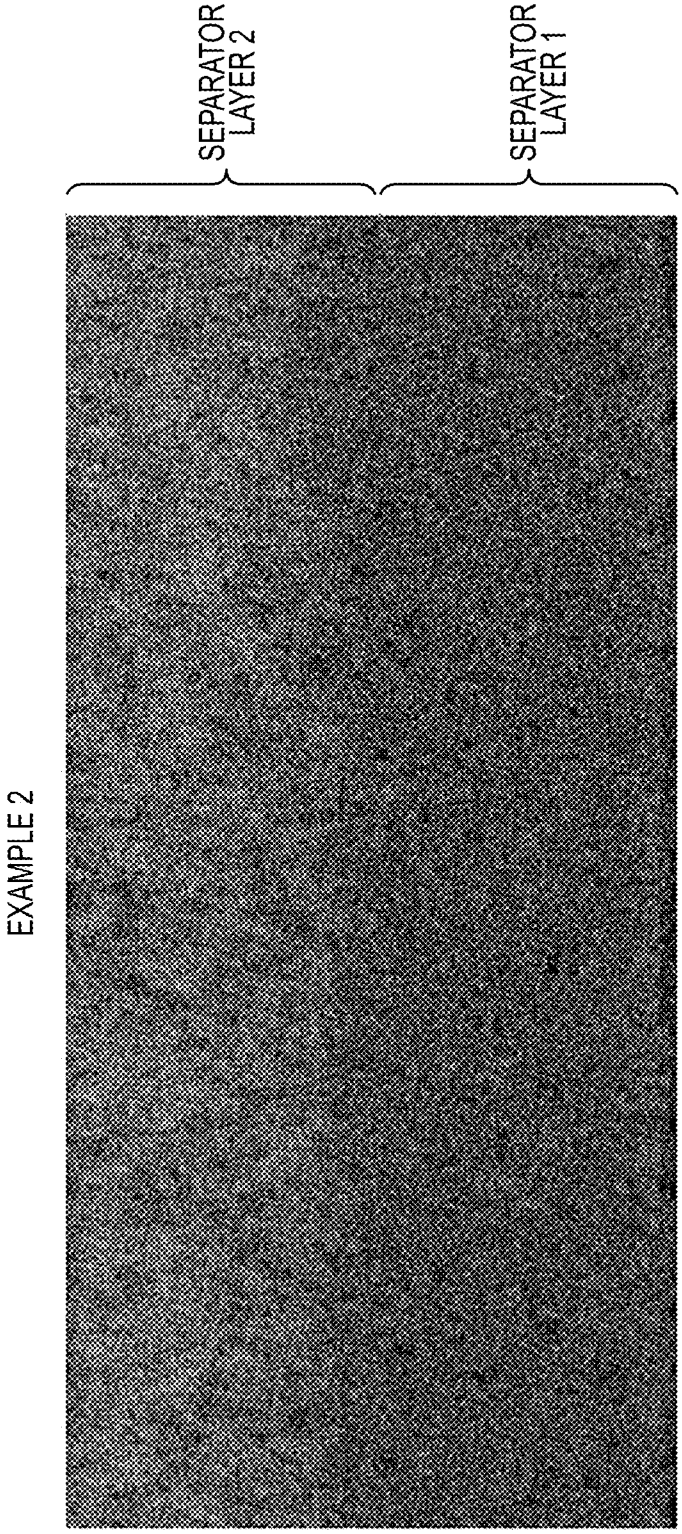
FIG. 9 shows an EDS analysis of the separator/separator bilayer of FIG. 7. The lighter regions correspond to the presence of carbon atoms.

FIG. 9 shows the distribution of carbon in the separator/separator bilayer as measured by EDS.

Analysis

An average pore diameter was calculated by dividing the SEM image of FIG. 7 into 10 equal sections spanning from the bottom of the image to the top. The diameter of each pore within a section was measured and an average was generated. This was repeated for each section. These sections were then referred to as "averaged distance to top" as each section spans approximately 10% of the total height of the bilayer from Example 2. For reference, an "average distance to top" of 10 refers to an area where the height is measured starting at the bottom-most point of the layer and spanning 0%-10% the total height of the layer or layers of interest. An "average distance to top" of 20 refers to an area where the height is measured from 10% of the total height of the layer(s) of interest to 20% of the total height of the layer(s) of interest. An "average distance to top" of 30 refers to an area where the height is measured from 20% of the total height of the layer(s) of interest to 30% the total height of the layer or layers of interest. This was repeated until the top of the layer(s) of interest was reached.

This process was repeated for FIG. 8, where the concentration of fluorine was measured within each section. The concentration of fluorine was converted to an adjusted value ranging from 0 to 1. The adjusted value was calculated by determining the highest average concentration of fluorine in the EDS analysis and assigning that concentration the adjusted value of 1. No fluorine present correlated to an adjusted value of 0. The average concentration of each section was then calculated based on this 0-1 scale.

This process was further repeated for FIG. 9, where the concentration of carbon was measured within each section. The concentration of carbon was converted to an adjusted value as described in the preceding paragraph.

As shown in Table 1, the average pore diameter of the separator/separator bilayer formed in Example 2 was 0.479 μm at the bottom of the separator/separator bilayer, 0.378 μm at 50% of the separator/separator bilayer height, and 0.663 μm near the top of the separator/separator bilayer. The area at 50% of the separator/separator bilayer height is the interface between Separator 1 and Separator 2.

Table 1 also shows that the average concentration of fluorine maximizes at the two areas with the lowest average pore diameter. When the averaged concentration of fluorine was 1, the average pore diameter was 0.378 μm. When the averaged concentration of fluorine was 0.995, the average pore diameter was 0.379 μm.

TABLE 1

| Averaged Distance to Top (%) | Average Pore Diameter (μm) | Fluorine Concentration (Adjusted value) | Carbon Concentration (Adjusted value) |
|---|---|---|---|
| 10 | 0.479 | 0.78 | 0.4 |
| 20 | 0.439 | 0.826 | 0.352 |
| 30 | 0.402 | 0.903 | 0.36 |
| 40 | 0.379 | 0.955 | 0.361 |
| 50 | 0.378 | 1 | 0.376 |
| 60 | 0.439 | 0.549 | 0.501 |
| 70 | 0.649 | 0.458 | 0.709 |
| 80 | 0.663 | 0.556 | 0.879 |
| 90 | 0.658 | 0.627 | 0.98 |
| 100 | 0.676 | 0.606 | 1 |

This change in porosity results from the migration and mixing of binders which occurs during the drying process. When the wet separator/separator bilayer is dried, the solvent may be pulled to the surface. As the solvent moves towards the surface of the bilayer, so does the binder that is dissolved in the solvent. As the binder from the bottom layer moves towards the surface, the binder may cross an interface, a region where one layer comes into contact with another layer. When the binder in the bottom layer moves into and across an interface, that binder will mix with the binders in the top layer. When these binders mix, one or more of the binders may precipitate out of the solvent and no longer remain mobile within their respective layer. This precipitation effect paired with a wet-on-wet coating process allows for the formation of multilayer stacks where one or more binders not only span an interface but the distribution of that binder within the multilayer stack may be controlled. This distribution of binder can be measured by tracking porosity changes from the bottom to the top of a multilayer stack. The distribution of binder can also be measured by tracking the concentration of specific elements from the bottom to the top of a multilayer stack where, within that multilayer stack, those specific elements are only found in the binder material used.

Example 3

Figure 10:
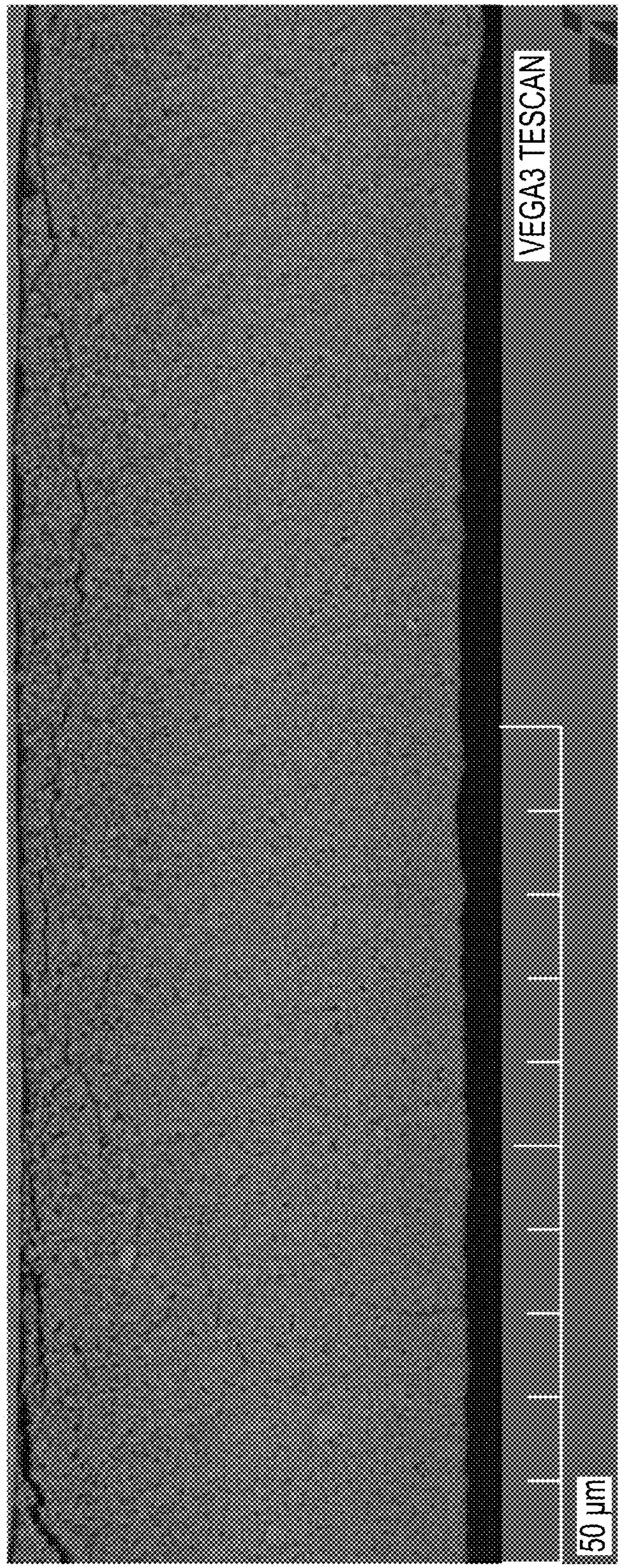
FIG. 10 shows a scanning electron microscope (SEM) image of the separator/separator bilayer produced in Example 3.

Example 3 was produced by densifying the separator/separator bilayer produced in Example 2. A SEM image of the separator/separator bilayer is shown in FIG. 10.

The average pore diameter (μm), concentration of fluorine, a concentration of carbon was measured in the same fashion as for Example 2.

As shown in Table 2, the average pore diameter of the densified separator/separator bilayer formed in Example 3 was 0.217 μm at the bottom of the separator/separator bilayer, 0.202 μm at 50% of the separator/separator bilayer height, and 0.2.57 μm near the top of the separator/separator bilayer. The area at 50% of the separator/separator bilayer height is the interface between separator layer 1 and separator layer 2.

The same porosity distribution effect is shown for the densified separator/separator bilayer as seen in Example 2. For Example 3, the interface of the densified separator/separator bilayer had the lowest porosity and the highest relative concentration of fluorine, and therefore the highest concentration of the fluorine containing binder.

TABLE 2

| Averaged Distance to Top (%) | Average Pore Diameter (μm) | Fluorine Concentration (Adjusted value) | Carbon Concentration (Adjusted value) |
|---|---|---|---|
| 10 | 0.217 | 0.812 | 0.239 |
| 20 | 0.208 | 0.894 | 0.264 |
| 30 | 0.211 | 0.956 | 0.270 |
| 40 | 0.214 | 0.993 | 0.288 |
| 50 | 0.202 | 1.000 | 0.280 |
| 60 | 0.205 | 0.663 | 0.384 |
| 70 | 0.226 | 0.538 | 0.576 |
| 80 | 0.257 | 0.537 | 0.727 |
| 90 | 0.292 | 0.614 | 0.809 |
| 100 | 0.355 | 0.583 | 1.000 |

What is claimed is:

1. A method for preparing an electrode slurry for use in an electrochemical cell comprising:

combining a solid electrolyte with a first binder dissolved in a first organic solvent to form a first slurry;

combining the first slurry with an electrode active material and a conductive additive to form a second slurry; and adding a second binder dissolved in a second organic solvent to the second slurry, wherein the addition of the second binder yields precipitation of the first binder.

2. The method of claim 1, wherein the first organic solvent and the second organic solvent are the same.

3. The method of claim 1, wherein the first organic solvent comprises a polar organic solvent.

4. The method of claim 3, wherein the first organic solvent comprises isobutyl isobutyrate.

5. The method of claim 1, wherein the first organic solvent comprises a non-polar organic solvent.

6. The method of claim 1, wherein the second organic solvent comprises a polar organic solvent.

7. The method of claim 1, wherein the second organic solvent comprises a non-polar organic solvent.

8. The method of claim 1, wherein the solid electrolyte comprises an oxide electrolyte, an oxysulfide electrolyte, a sulfide electrolyte, a halide electrolyte, or a nitride electrolyte, or a combination thereof.

9. The method of claim 1, wherein the electrode active material comprises one or more of a coated metal oxide, an uncoated metal oxide, a coated metal sulfide, an uncoated metal sulfide, elemental sulfide, and a metal fluoride.

10. The method of claim 1, wherein the conductive additive comprises a conductive carbon material.

11. The method of claim 1, wherein the first binder comprises one or more thermoplastic elastomers.

12. The method of claim 1, wherein the second binder comprises a fluororesin.

13. The method of claim 12, wherein the fluororesin comprises vinylidene fluoride (VdF) and hexafluoropropylene (HFP) structural units.

14. The method of claim 1, wherein the first binder in the first solvent has a concentration ranging from about 1.0 wt % to about 40 wt %.

15. The method of claim 1, wherein the second binder in the second solvent has a concentration ranging from about 1.0 wt % to about 40 wt %.

16. The method of claim 1, further comprising milling the combined solid electrolyte and the first binder.

17. A method for preparing an electrode slurry for use in an electrochemical cell comprising:

combining a solid electrolyte with a first binder dissolved in a first organic solvent to form a first slurry;

combining the first slurry with an electrode active material and a conductive additive to form a second slurry;

adding a second binder dissolved in a second organic solvent to the second slurry;

casting the second slurry onto a current collector;

coating a third slurry on top of the second slurry, thereby forming an interface between the second slurry and the third slurry, the third slurry being devoid of the second binder; and drying the second slurry and the third slurry, wherein during the drying the second binder is carried from the second slurry into the third slurry;

wherein the addition of the second binder causes the first binder to precipitate in the second slurry, and wherein the dried third slurry comprises the second binder.

18. The method of claim 17, wherein the current collector comprises copper, nickel, stainless steel, lithium alloys, or carbon fiber.

19. The method of claim 17, wherein the first organic solvent comprises a polar organic solvent.

20. The method of claim 19, wherein the first organic solvent comprises isobutyl isobutyrate.

21. The method of claim 17, wherein the second organic solvent comprises a polar organic solvent.

22. The method of claim 17, wherein the second organic solvent comprises a non-polar organic solvent.

23. The method of claim 17, wherein the first binder comprises one or more thermoplastic elastomers.

24. The method of claim 17, wherein the second binder comprises a fluororesin.

25. A method for preparing an electrode slurry for use in an electrochemical cell comprising:

combining one or more electrode components with a first binder dissolved in a first organic solvent to form a first slurry, the one or more electrode components comprising an electrode active material, a solid electrolyte material, a conductive additive, or a combination thereof; and adding a second binder dissolved in a second organic solvent to the first slurry, wherein the addition of the second binder yields precipitation of the first binder.

26. The method of claim 25, further comprising combining the first slurry with one or more additional electrode components to form a second slurry before adding the second binder dissolved in the second organic solvent to the first slurry.

27. The method of claim 25, wherein the first organic solvent comprises a polar organic solvent.

28. The method of claim 25, wherein the first binder comprises one or more thermoplastic elastomers.

29. The method of claim 25, wherein the second binder comprises a fluororesin.

* * * * *